United States Patent
Kim et al.

(10) Patent No.: US 10,810,788 B2
(45) Date of Patent: Oct. 20, 2020

(54) MULTICHANNEL HEAD ASSEMBLY FOR THREE-DIMENSIONAL MODELING APPARATUS, HAVING POLYGON MIRROR ROTATING IN SINGLE DIRECTION, AND THREE-DIMENSIONAL MODELING APPARATUS USING SAME

(71) Applicant: KOREA INSTITUTE OF INDUSTRIAL TECHNOLOGY, Cheonan-si, Chungcheongnam-do (KR)

(72) Inventors: Seung Taek Kim, Cheonan-si (KR); Jong Seok Kim, Ansan-si (KR); Hyung Tae Kim, Daegu (KR); Kyung Chan Jin, Cheonan-si (KR); Moon Soo Park, Yongin-si (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 617 days.

(21) Appl. No.: 15/540,546

(22) PCT Filed: Oct. 28, 2015

(86) PCT No.: PCT/KR2015/011427
§ 371 (c)(1),
(2) Date: Jun. 28, 2017

(87) PCT Pub. No.: WO2016/068598
PCT Pub. Date: May 6, 2016

(65) Prior Publication Data
US 2017/0330370 A1    Nov. 16, 2017

(30) Foreign Application Priority Data
Oct. 30, 2014 (KR) .......................... 10-2014-0148843

(51) Int. Cl.
*G06T 15/20* (2011.01)
*B29C 64/00* (2017.01)
(Continued)

(52) U.S. Cl.
CPC ............ *G06T 15/205* (2013.01); *B29C 64/00* (2017.08); *B29C 64/135* (2017.08);
(Continued)

(58) Field of Classification Search
None
See application file for complete search history.

(56) References Cited

U.S. PATENT DOCUMENTS

| | | | |
|---|---|---|---|
| 5,780,070 A | 7/1998 | Yamazawa et al. | |
| 2004/0254476 A1* | 12/2004 | Quadling | A61B 5/0066 600/476 |

(Continued)

FOREIGN PATENT DOCUMENTS

| | | |
|---|---|---|
| JP | 4049654 B2 | 2/2008 |
| KR | 2014/0047103 A | 4/2014 |
| WO | 2004/011876 A1 | 2/2004 |

OTHER PUBLICATIONS

PCT/KR2015/011427—International Search Report dated Feb. 17, 2016, 3 pages.

*Primary Examiner* — Joel G Horning
(74) *Attorney, Agent, or Firm* — Rabin & Berdo, P.C.

(57) ABSTRACT

The present invention relates to a multichannel head assembly for a three-dimensional modeling apparatus which can improve productivity by simultaneously or synchronously modeling a plurality of three-dimensional shaped objects having the same shape or different shapes, and a three-dimensional modeling apparatus using the same, the present invention comprising: a modeling light source unit for allowing N modeling beams to be incident to a light guide
(Continued)

unit; the light guide unit for receiving the N incident modeling beams and having a function of guiding each of the N modeling beams along a predetermined path so as to allow the N modeling beams to be incident to N modeling planes in one-to-one correspondence with each other; and a control unit for controlling driving of the modeling light source unit and driving of the light guide unit to be linked with each other.

15 Claims, 14 Drawing Sheets

(51) Int. Cl.
*B29C 64/268* (2017.01)
*B29C 64/182* (2017.01)
*B29C 64/135* (2017.01)
*B29C 64/153* (2017.01)
*G02B 26/12* (2006.01)
*G06T 17/20* (2006.01)
*B33Y 30/00* (2015.01)
*B33Y 10/00* (2015.01)

(52) U.S. Cl.
CPC .......... *B29C 64/153* (2017.08); *B29C 64/182* (2017.08); *B29C 64/268* (2017.08); *G02B 26/123* (2013.01); *G06T 17/20* (2013.01); *B33Y 10/00* (2014.12); *B33Y 30/00* (2014.12)

(56) References Cited

U.S. PATENT DOCUMENTS

| | | | |
|---|---|---|---|
| 2009/0175977 A1* | 7/2009 | Kuzusako | B29C 64/106 425/174.4 |
| 2014/0052288 A1* | 2/2014 | El-Siblani | G05B 19/042 700/119 |
| 2014/0263209 A1 | 9/2014 | Burris et al. | |

* cited by examiner

FIG. 7
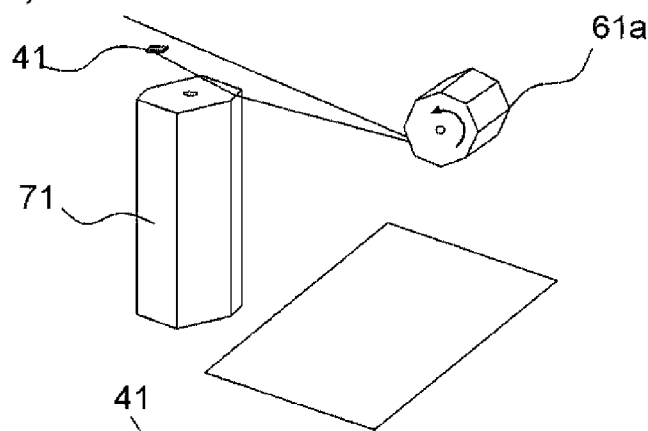
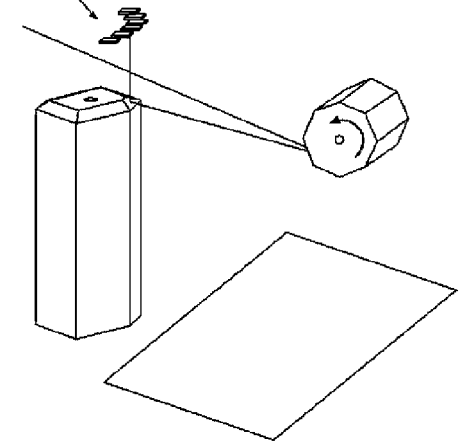
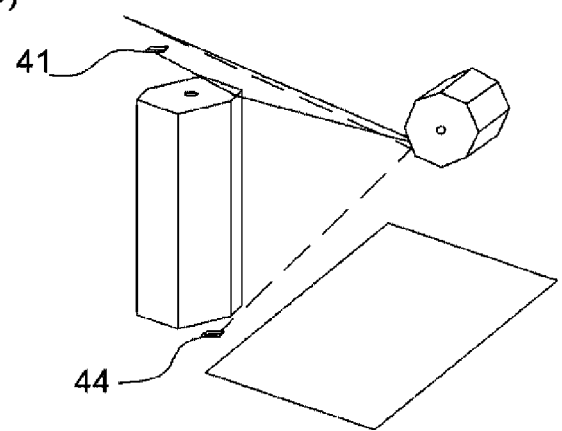

FIG. 13
(a)
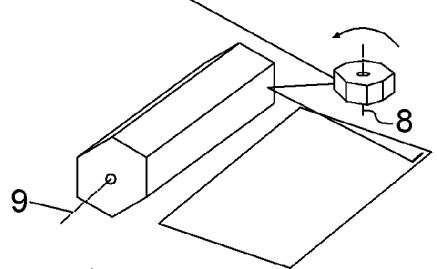
(b)
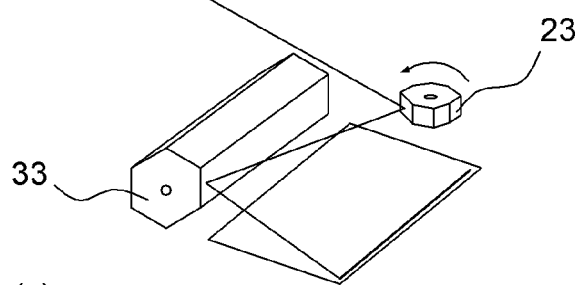
(c)
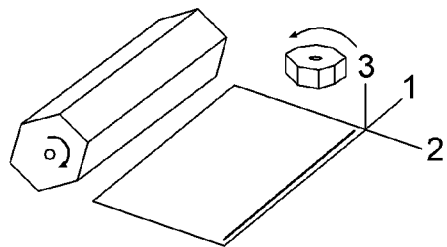
(d)
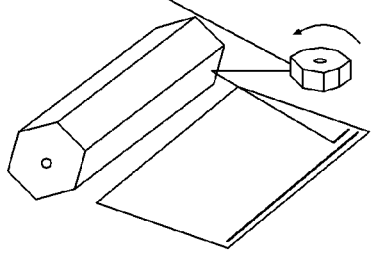

MULTICHANNEL HEAD ASSEMBLY FOR THREE-DIMENSIONAL MODELING APPARATUS, HAVING POLYGON MIRROR ROTATING IN SINGLE DIRECTION, AND THREE-DIMENSIONAL MODELING APPARATUS USING SAME

CROSS-REFERENCE TO RELATED APPLICATION

This application claims priority to and the benefit of Korean Patent Application No. 10-2014-0148843, filed on Oct. 30, 2014, the disclosure of which is incorporated herein by reference in its entirety.

BACKGROUND OF THE INVENTION

Field of the Invention

The present invention relates to a multi-channel head assembly of three-dimensional modeling equipment including a polygon mirror rotating in a single direction and three-dimensional modeling apparatus equipment using the same and, more particularly, to a multi-channel head assembly of three-dimensional modeling equipment which can improve productivity by modeling a plurality of three-dimensional modeling products having the same shape or different shapes at the same time or through synchronization and three-dimensional modeling equipment using the same.

Description of the Related Art

3-D printing is one of methods for producing a product, and it has a small loss of a material compared to a conventional cutting work because a stacking method is used and has been chiefly used to fabricate a test product because a relatively cheap manufacturing cost is required. Recently, a technology in this field overpasses the fabrication of a test product and has been recognized as the possibility of a next-generation production technology. The reason for this is that a fabrication speed is increased, the completeness (resolution) of an output matter is improved, an available material is diversified and persons' accessibility has been increased due to a reduction in the size of an apparatus. Such a 3-D printing method basically includes methods, such as a Stereo Lithography Apparatus (SLA), Selective Laser Sintering (SLS) and Fused Deposition Modeling (FDM).

Korean Patent No. 1407048 (Title of the invention: 3D line scan printing device and thereof method, hereinafter referred to as a "conventional technology 1") is a method of stacking thin plate type sheets generated as photopolymer resin to which light has been radiated is hardened along a shape of light by scanning the light to a water tank containing the photopolymer resin in accordance with the SLA method of 3-D printing modeling technology types, adopts a method for scanning light in a line form not a dot or cross-section form, and discloses a configuration including a transfer rail and a line scan optical head as shown in FIG. 1 for this method.

SUMMARY OF THE INVENTION

Technical Problem

The conventional technology 1 has a configuration in which the head adopts a line-based (X axis) scan method in the scanning of modeling light and the head moves to a corresponding location while sliding on the 2-axis transfer rail and scans modeling light. Accordingly, the conventional technology 1 has a first problem in that control precision and a modeling speed are poor compared to a method for controlling a light path, a second problem in that modeling quality is low because a relatively heavy head is directly moved and thus vibration is generated when the head is accelerated or decelerated, and a third problem in that an increase of the modeling speed and modeling productivity is limited compared to the complexity of the configuration because multiple heads cooperate to model a single modeling product.

Solution to the Problem

The present invention contrived to achieve the technical object described above provides a multi-channel head assembly of three-dimensional modeling equipment, including a modeling light source unit which has N modeling beams incident on a light guide unit, a light guide unit which receives the incident N modeling beams and has a function for having the N modeling beams incident on the respective N modeling planes by guiding each of the N modeling beams to a specific path, and a control unit which controls the driving of the modeling light source unit and the light guide unit by interlocking, wherein a three-dimensional modeling product is modeled by radiating each of the N modeling beams to the entire surface of one of the N modeling planes in a specific scanning pattern. The multi-channel head assembly of the three-dimensional modeling equipment according to the present invention can model a plurality of three-dimensional modeling products at the same time, can further improve a modeling speed and modeling productivity by synchronizing or simultaneously performing a plurality of modeling works, and can be applied to three-dimensional modeling apparatuses of various methods including the SLA or SLS method.

Advantageous Effect(s) of the Invention

The present invention has a first effect capable of performing the radiation of a modeling beam at high speed by adopting the polygon mirror rotating in a single direction and having the polygon mirror continue to rotate without a stop, a second effect capable of reducing vibration and noise generated from the head apparatus and thus improving quality of a modeling layer formed in a modeling plane by performing control through control of the rotation angular velocity and rotation angular displacement of two polygon mirrors in controlling the location where a modeling beam is radiated, and a third effect capable of further enhancing a modeling speed and modeling productivity by modeling a plurality of three-dimensional modeling products at the same time and synchronizing or simultaneously performing a plurality of such modeling works. Furthermore, the present invention may be applied to three-dimensional modeling apparatuses of various methods including the SLA or SLS method.

BRIEF DESCRIPTION OF THE DRAWINGS

FIG. 7 is an explanatory diagram showing an embodiment of a first photosensor unit and a fourth photosensor unit in the multi-channel head assembly of the present invention.

FIG. 13 is a perspective view showing an embodiment ((2-2)-th configuration) of a method for scanning a modeling plane using the multi-channel head assembly of three-dimensional modeling equipment of the present invention.

DESCRIPTION OF REFERENCE NUMERALS

Figure 1:
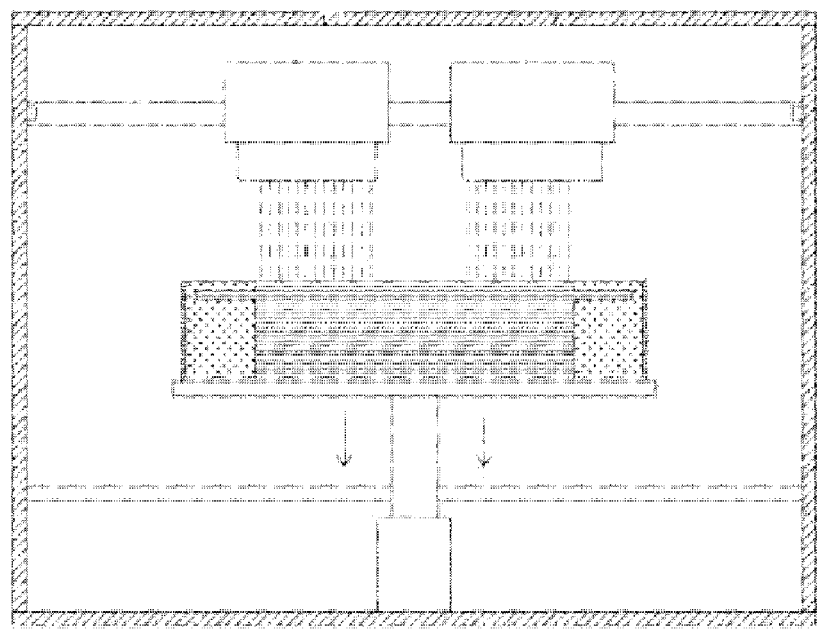
FIG. 1 is a schematic diagram of a three-dimensional modeling apparatus having a multi-head according to a conventional technology 1.

| | |
|---|---|
| 10: modeling plane | 11: modeling beam |
| 12: line scan | 15: modeling light source unit |
| 16: modeling light source | 17: light modulation unit |
| 18: multiplexer | 19: demultiplexer |
| M: optical mirror | 40: control unit |
| 41: first photosensor unit | 42: second photosensor unit |
| 43: third photosensor unit | 44: fourth photosensor unit |
| 50: modeling light incident angle correction unit | |
| <Light guide unit> | |
| A: A type light guide unit | r: radius direction |
| t: tangent direction | |
| h: direction vertical to modeling plane | |
| (1-1)-th to (1-N)-th light reflection units 60a, 60b, 60c (N = 3) | |
| (1-1)-th to (1-N)-th polygon reflectors 61a, 61b, 61c (N = 3) | |
| 60a: (1-1)-th light reflection unit | |
| 61a: (1-1)-th polygon reflector | |
| 60b: (1-2)-th light reflection unit | |
| 61b: (1-2)-th polygon reflector | |
| 60c: (1-3)-th light reflection unit | |
| 61c: (1-3)-th polygon reflector | |
| 70: second light reflection unit | 71: second polygon reflector |
| B: B type light guide unit | X: light guide module |
| 1: first axis | 2: second axis |
| 3: third axis | 4: fourth axis |
| 5: fifth axis | 6: sixth axis |
| 7: seventh axis | 8: eighth axis |
| 9: ninth axis | 10x: tenth axis |
| 11x: eleventh axis | 20: first light guide unit |
| 21: first polygon mirror | 22: third polygon mirror |
| 23: fifth polygon mirror | 24: seventh polygon mirror |
| 30: second light guide unit | 31: second polygon mirror |
| 32: fourth polygon mirror | 33: sixth polygon mirror |
| 34: eighth polygon mirror | |

DETAILED DESCRIPTION OF THE PREFERRED EMBODIMENTS

The present invention contrived to supplement the problems and satisfy the needs provides a multi-channel head assembly of three-dimensional modeling apparatus, including a modeling light source unit which has N modeling beams incident on a light guide unit, a light guide unit which receives the incident N modeling beams and has a function for having the N modeling beams incident on the respective N modeling planes by guiding each of the N modeling beams to a specific path, and a control unit which controls the driving of the modeling light source unit and the light guide unit by interlocking, wherein a three-dimensional modeling product is modeled by radiating each of the N modeling beams to the entire surface of one of the N modeling planes in a specific scanning pattern.

Furthermore, the N modeling beams incident on the light guide unit may have an identical wavelength, and all of N three-dimensional modeling products modeled by the N modeling beams may have the same shape.

Furthermore, the modeling light source unit may include a light output distributor, and the light output distributor may generate the N modeling beams by outputting and distributing an input beam.

Furthermore, the N modeling beams incident on the light guide unit may have the same wavelength, and N three-dimensional modeling products modeled by the N modeling beams may have different shapes.

Furthermore, the N modeling beams incident on the light guide unit may have different wavelengths, and N three-dimensional modeling products modeled by the N modeling beams may have different shapes.

Furthermore, the N modeling beams incident on the light guide unit may have different wavelengths, and N three-dimensional modeling products modeled by the N modeling beams may have the same shape.

Furthermore, the modeling light source unit may further include a light modulation unit 17 having a function for modulating the wavelength, phase or power of a beam.

Furthermore, the modeling light source unit may further include a multiplexer 18 having a function for generating a composed beam and a demultiplexer 19 having a function for splitting a composed beam for each wavelength band.

Furthermore, the N modeling beams which are output of the demultiplexer 19 may be synchronized or simultaneously generated.

Furthermore, the light guide unit may include (1-1)-th to (1-N)-th light reflection units 60a, 60b, 60c (N=3) having a function for having the respective N modeling beams incident on a second light reflection unit 70, 30 by primarily reflecting the N modeling beams and a second light reflection unit 70 having a function for having the N modeling beams received from the (1-1)-th to (1-N)-th light reflection units 60*a*, 60*b*, 60*c* (N=3) incident on the N modeling planes by secondarily reflecting the N modeling beams. The (1-1)-th to (1-N)-th light reflection units 60*a*, 60*b*, 60*c* (N=3) may be spaced apart at specific angles around the second light reflection unit 70 using the second light reflection unit 70 as the center.

Furthermore, each of the (1-1)-th to (1-N)-th light reflection units 60*a*, 60*b*, 60*c* (N=3) may include each of (1-1)-th to (1-N)-th polygon reflectors 61*a*, 61*b*, 61*c* (N=3) having a specific number of light reflection surfaces on its side and rotating around a specific rotating axis. The rotating axis of each of the (1-1)-th to (1-N)-th polygon reflectors 61*a*, 61*b*, 61*c* (N=3) may be disposed in parallel to the N modeling planes. The second light reflection unit 70 may include a second polygon reflector 71 having a specific number of light reflection surfaces on its side and rotating around a specific rotating axis. The rotating axis of the second polygon reflector 71 may be disposed perpendicular to the N modeling planes.

Furthermore, a scanning pattern for each of the N modeling planes may be a pattern formed as each of a plurality of times of line scans having a direction parallel to a direction (radius direction) from the location of the second polygon reflector 71 to the location of each of the (1-1)-th to (1-N)-th polygon reflectors 61*a*, 61*b*, 61*c* (N=3) is stepped at a specific interval in a direction (tangent direction) perpendicular to the radius direction. The plurality of times of line scans in the direction parallel to the radius direction may be performed as each of the (1-1)-th to (1-N)-th polygon reflectors 61*a*, 61*b*, 61*c* (N=3) rotates, and the stepping at the specific interval in the tangent direction may be performed as the second polygon reflector 71 rotates.

Furthermore, the present invention provides a method for scanning a plurality of modeling planes using the multi-channel head assembly of the three-dimensional modeling equipment according to the present invention, including (i) a step s10 of rotating, by the (1-1)-th to (1-N)-th polygon reflectors 61*a*, 61*b*, 61*c* (N=3), in a single direction and starting, by the modeling light source unit 15, to have a modeling beam incident on the (1-1)-th to (1-N)-th polygon reflectors 61*a*, 61*b*, 61*c* (N=3), (ii) a step s20 of secondarily reflecting, by the second polygon reflector 71, a modeling beam primarily reflected by each of the (1-1)-th to (1-N)-th polygon reflectors 61*a*, 61*b*, 61*c* (N=3) and then performing a line scan on the modeling plane 10 in the direction parallel to the radius direction, while each of the (1-1)-th to (1-N)-th polygon reflectors 61*a*, 61*b*, 61*c* (N=3) continues to rotate at a specific speed, (iii) a step s30 of terminating the line scan in the step (ii) by controlling each of the N modeling beams so that the N modeling beams are not radiated to the N modeling planes 10, (iv) a step s40 of rotating, by the second polygon reflector 71, at a specific angular displacement and continuing to rotate, by the (1-1)-th to the (1-N)-th polygon reflectors, in the same direction until a next reflection surface neighboring a previous reflection surface reaches a specific location in order to perform a next line scan after stepping at a specific interval in the tangent direction after the line scan in the step (ii), and (v) a step s50 of repeatedly performing the step (i) to the step (iv) on the entire surface of each of the N modeling planes 10 until the radiation of the modeling beam is completed, wherein each of the (1-1)-th to (1-N)-th polygon reflectors 61*a*, 61*b*, 61*c* (N=3) rotates only in a specific one direction.

Furthermore, after the step (v), a step s55 of preparing, by the second polygon reflector 71, to rotate in a direction identical to a rotation direction in the step (v) may be further included.

Furthermore, after the step (v), a step s55 of preparing, by the second polygon reflector 71, to rotate in a direction opposite a rotation direction in the step (v) may be further included.

Furthermore, the rotation of the second polygon reflector 71 and the rotation of the (1-1)-th to (1-N)-th polygon reflectors 61*a*, 61*b*, 61*c* (N=3) in the step (iv) may be simultaneously performed.

Furthermore, the present invention provides a multi-channel head assembly of three-dimensional modeling equipment in which a scanning pattern for each of the N modeling planes is a pattern in which a plurality of times of line scans is performed in a direction (tangent direction) perpendicular to a radius direction as the line scan is stepped at a specific interval in a direction parallel to the direction (radius direction) from the location of the second polygon reflector 71 to the location of each of the (1-1)-th to (1-N)-th polygon reflectors 61*a*, 61*b*, 61*c* (N=3), the plurality of times of line scans in the direction parallel to the tangent direction is performed as the second polygon reflector 71 rotates, and the stepping at the specific interval in the radius direction is performed as the (1-1)-th to (1-N)-th polygon reflectors 61*a*, 61*b*, 61*c* (N=3) rotate.

Furthermore, the present invention provides a method for scanning a plurality of modeling planes using the multi-channel head assembly of the three-dimensional modeling equipment according to the present invention, including (i) a step s100 of rotating, by the second polygon reflector 71, in a single direction and starting, by the modeling light source unit 15, to have the N modeling beams incident on the (1-1)-th to (1-N)-th polygon reflectors 61*a*, 61*b*, 61*c* (N=3), respectively, (ii) a step s200 of secondarily reflecting, by the second polygon reflector 71, the N modeling beams primarily reflected by the (1-1)-th to (1-N)-th polygon reflectors 61*a*, 61*b*, 61*c* (N=3), respectively, and then performing a line scan on the N modeling planes 10 in the direction parallel to the tangent direction, while the second polygon reflector continues to rotate at a specific speed, (iii) a step s300 of terminating the line scan in the step (ii) by controlling each of the N modeling beams so that the modeling beam is not radiated to the N modeling planes 10, (iv) a step s400 of rotating, by the (1-1)-th to (1-N)-th polygon reflectors 61*a*, 61*b*, 61*c* (N=3), at a specific angular displacement and continuing to rotate, by the second polygon reflector 71, in the same direction until a next reflection surface neighboring a previous reflection surface reaches a specific location in order to perform a next line scan after stepping at a specific interval in the radius direction after the line scan in the step (ii), and (v) a step s500 of repeatedly performing the step (i) to the step (iv) on the entire surface of each of the N modeling planes 10 until the radiation of the modeling beam is completed, wherein the second polygon reflector 71 rotates only in a specific one direction.

Furthermore, after the step (v), a step s550 of preparing, by each of the (1-1)-th to (1-N)-th polygon reflectors 61*a*, 61*b*, 61*c* (N=3), to rotate in a direction identical to a rotation direction in the step (v) may be further included.

Furthermore, after the step (v), a step s550 of preparing, by each of the (1-1)-th to (1-N)-th polygon reflectors 61*a*, 61b, 61c (N=3), to rotate in a direction opposite a rotation direction in the step (v) may be further included.

Furthermore, the rotation of the second polygon reflector 71 and the rotation of the (1-1)-th to (1-N)-th polygon reflectors 61a, 61b, 61c (N=3) in the step (iv) may be simultaneously performed.

Furthermore, in the multi-channel head assembly of the three-dimensional modeling equipment according to the present invention, the present invention provides a multi-channel head assembly of the three-dimensional modeling equipment in which the control unit further includes a first photosensor unit 41 having a function for determining start timing of each of a plurality of times of line scans in the direction parallel to the radius direction or the tangent direction by sensing a modeling beam incident on a specific point and synchronizing the driving of the modeling light source unit 15 and the driving of the (1-1)-th to (1-N)-th polygon reflectors 61a, 61b, 61c (N=3) or the second polygon reflector 71.

Furthermore, the control unit may further include a fourth photosensor unit 44 having a function for determining end timing of each of a plurality of times of line scans in the direction parallel to the radius direction or the tangent direction by sensing a modeling beam incident on a specific point and synchronizing the driving of the modeling light source unit 15 and the driving of the (1-1)-th to (1-N)-th polygon reflectors 61a, 61b, 61c (N=3), 20 or the second polygon reflector 71, 30.

Furthermore, the control unit 40 may further include a second photosensor unit 42 having a function for determining the first start timing of the radiation of the modeling beam to each of the N modeling planes 10 by sensing the modeling beam incident on a specific location of each of the N modeling planes 10 and synchronizing the driving of the modeling light source unit 15 and the driving of the (1-1)-th to (1-N)-th polygon reflectors 61a, 61b, 61c (N=3), 20 or the second polygon reflector 71, 30.

Furthermore, the control unit 40 may further include a third photosensor unit 43 having a function for determining the final end timing of the radiation of the modeling beam to each of the N modeling planes 10 by sensing the modeling beam incident on a specific location of each of the N modeling planes 10.

Furthermore, the light guide unit may include N light guide modules X, and the control unit may control the modeling light source unit and each of the N light guide modules X by interlocking.

Furthermore, each of the N light guide modules X may include a first light guide unit 20 disposed at a specific location over any one of the N modeling planes 10 and having a function for receiving one of the N modeling beams and for having the received modeling beam incident on the second light guide unit 30 by primarily reflecting the received modeling beam and a second light guide unit 30 disposed at a specific location over any one of the N modeling planes and having a function for having the modeling beam received from the first light guide unit 20 incident on one of the N modeling planes 10 by secondarily reflecting the received modeling beam. At least one of the first light guide unit 20 and the second light guide unit 30 may include a specific number of light reflection surfaces on its side and include a polygon mirror rotating in a single direction around a specific rotating axis. The control unit may control the driving of the modeling light source unit, the first light guide unit and the second light guide unit by interlocking.

Furthermore, each of the N modeling beams may be incident on the first light guide unit 20 at a specific angle to a second axis 2 with respect to each of the modeling planes having a first axis 1 and the second axis 2 which are perpendicular to a third axis 3 and perpendicular to each other. A scanning pattern for each of the N modeling planes may be a pattern formed as each of a plurality of times of line scans having a direction parallel to the second axis 2 is stepped at a specific interval in the direction of the first axis 1.

Furthermore, the first light guide unit 20 may include a first polygon mirror 21. The first polygon mirror 21 may be disposed using a fourth axis 4 parallel to the first axis 1 as a rotation center axis. The second light guide unit 30 may include a second polygon mirror 31. The second polygon mirror 31 may be disposed using a fifth axis 5 parallel to the third axis 3 as a rotation center axis. The plurality of times of line scans in the direction parallel to the second axis 2 may be performed as the first polygon mirror 21 rotates. The stepping at the specific interval in the direction of the first axis 1 may be performed as the second polygon mirror 31 rotates.

Furthermore, the first light guide unit 20 may include a seventh polygon mirror 24. The rotation center axis of the seventh polygon mirror 24 may be disposed using a tenth axis 10$x$ parallel to the third axis 3 as the rotation center axis. The second light guide unit 30 may include an eighth polygon mirror 34. The rotation center axis of the eighth polygon mirror 34 may be disposed using an eleventh axis 11$x$ parallel to the first axis 1 as the rotation center axis. The plurality of times of line scans in the direction parallel to the second axis 2 may be performed as the eighth polygon mirror 34 rotates. The stepping at the specific interval in the direction of the first axis 1 may be performed as the seventh polygon mirror 24 rotates.

Furthermore, each of the N modeling beams may be incident on the first light guide unit 20 at a specific angle to a second axis 2 with respect to each of the modeling planes having a first axis 1 and the second axis 2 which are perpendicular to a third axis 3 and perpendicular to each other. A scanning pattern for each of the N modeling planes may be a pattern formed as each of a plurality of times of line scans having a direction parallel to the first axis 1 is stepped at a specific interval in the direction of the second axis 2.

Furthermore, the first light guide unit 20 may include a third polygon mirror 22. The third polygon mirror 22 may be disposed using a sixth axis 6 parallel to the first axis 1 as a rotation center axis. The second light guide unit 30 may include a fourth polygon mirror 32. The fourth polygon mirror 32 may be disposed using a seventh axis 7 parallel to the third axis 3 as a rotation center axis. The line scan in the direction parallel to the first axis 1 may be performed as the fourth polygon mirror 32 rotates. The stepping at the specific interval in the direction of the second axis 2 may be performed as the third polygon mirror 22 rotates.

Furthermore, the first light guide unit 20 may include a fifth polygon mirror 23. The fifth polygon mirror 23 may be disposed using an eighth axis 8 having a specific angle to the third axis 3 as a rotation center axis. The second light guide unit 30 may include a sixth polygon mirror 33. The sixth polygon mirror 33 may be disposed using a ninth axis 9 parallel to the first axis 1 as a rotation center axis. The plurality of times of line scans in the direction parallel to the first axis 1 may be performed as the fifth polygon mirror 23 rotates. The stepping at the specific interval in the direction of the second axis 2 may be performed as the sixth polygon mirror 33 rotates.

Furthermore, the present invention provides three-dimensional modeling equipment for being supplied with a modeling material, forming a modeling layer, and modeling a three-dimensional modeling product by stacking the modeling layers, wherein the radiation of a modeling beam is performed using the multi-channel head assembly of the three-dimensional modeling equipment according to the present invention.

The multi-channel head assembly of three-dimensional modeling apparatus according to the present invention performs multi-modeling, and it may first model (a first multi-modeling mode) a plurality of three-dimensional modeling products having the same shape or second model (a second multi-modeling mode) a plurality of three-dimensional modeling products having different shapes. In this case, even in the second multi-modeling mode, some of three-dimensional modeling products may have the same shape. Furthermore, the modeling of a plurality of three-dimensional modeling products may be synchronized or may be preferably performed at the same time.

Prior to a description of the present invention using a method of describing major elements and embodiments, related terms are defined.

A modeling plane 10 may mean a region to which a modeling beam whose path is controlled is radiated in a multi-channel head assembly of three-dimensional modeling equipment of the present invention or may mean a logical region whose location on a plane is described as a coordinate value for a specific coordinate axis. An actual modeling plane 10 may be directly exposed to the outside or may be the state in which it has been blocked by a transparent member capable of transmitting a modeling beam although the modeling beam is not directly radiated to the modeling plane 10. Furthermore, the modeling plane 10 may be expressed as an effective forming region in that the generation of an action, such as photo-curing or sintering curing, attributable to the application of energy to a modeling beam is limited to the region of the modeling plane 10.

The multi-channel head assembly of three-dimensional modeling equipment of the present invention functions to finally generate a plurality of (N) modeling beams through actions, such as generation, modulation, a change of a path, and composition, and to shape a plurality of (N) three-dimensional modeling products by scanning the plurality of (N) modeling beams to the entire surfaces of a plurality of (N) modeling planes in a specific scanning pattern through a specific path. The multi-channel head assembly includes a modeling light source unit 15 which has N modeling beams incident on a light guide unit, the light guide unit which guides each of the incident N modeling beams in a specific path and has the incident N modeling beams incident on N modeling planes, respectively, and a control unit which controls the driving of the modeling light source unit 15 and the light guide unit by interlocking as major elements. The N value is a natural number of 2 or more.

The modeling light source unit 15 functions to generate a modeling beam and to have the modeling beam incident on the light guide unit 20 to be described later, and includes one or more modeling light sources. A modeling beam is not limited to the type of light, such as a UV ray or a laser, because it has only to have energy necessary to harden a modeling material used. If a laser is used, however, high energy can be focused and output intensity and on or off control of the laser are easy. Accordingly, a laser is suitable for use as a modeling beam. The output and wavelength of a laser need to be determined in accordance with a modeling material used. In order to generate a laser, a laser diode (LD) or a device, such as a VCSEL, may be used, but is not limited thereto. If a modeling beam having a different wavelength is required, a wavelength-variable type device may be adopted as a modeling light source, but a plurality of modeling light sources for generating beams of different wavelengths may be adopted. To use a single device when one modeling beam is generated is not necessarily limited. After a laser array is generated using a plurality of devices (the same wavelength), the layers may be focused on a single piece of laser light using a relay module. Furthermore, designing a configuration for improving quality of a modeling beam or reducing the size of a head assembly by applying optical elements, such as various light modulation modules or focusing lenses and a prism, may be taken into consideration.

For multi-shaping, the wavelengths of N modeling beams used for a plurality of (N) target three-dimensional modeling products, respectively, may be set to be identical or different. Such setting is implemented by the modeling light source unit 15. If this is considered in connection with the aforementioned multi-modeling mode, N modeling beams having the same wavelength may be used or N modeling beams having different wavelengths may be used so that the N three-dimensional modeling products have the same shape (the first multi-modeling mode).

Furthermore, in order for the N three-dimensional modeling products to have different shapes (the second multi-modeling mode), N modeling beams having the same wavelength may be used or N modeling beams having different wavelengths may be used.

More specifically, in an embodiment of a configuration for generating N modeling beams having the same wavelength, the modeling light source unit 15 may be configured to include a light output distributor. The light output distributor may generate N modeling beams by outputting and distributing a single input beam. In this case, the output value of the single input beam needs to be determined so that the single input beam has sufficient output capable of curing or sintering a modeling material even after the output becomes 1/N. Such a configuration has advantages in that the size of a head assembly can be reduced because a modeling light source for actually generating a modeling beam can become a single light source and there is no need for a separate element for synchronization/simultaneousness between N modeling channels because all of the N modeling channels are subjected to synchronization/simultaneousness. The modeling light source unit 15 including the light output distributor may also be applied to a B type light guide unit B in addition to an A type light guide unit A to be described later.

In another embodiment of the configuration for generating N modeling beams having the same wavelength, a method for applying N modeling light sources from the beginning or composing modeling beams from M modeling light sources and splitting it into N modeling beams again may be used. The modeling light source unit 15 having such a configuration may also be applied to the B type light guide unit B in addition to the A type light guide unit A to be described later.

Furthermore, in a configuration for generating N modeling beams having different wavelengths, N modeling light sources are used, but the modeling light sources may be used to generate beams having different wavelengths or a wavelength-variable type modeling light source may be applied.

The modeling light source unit 15 having such a configuration may also be applied to the B type light guide unit B in addition to the A type light guide unit A to be described later.

A light modulation unit 17 for modulating the wavelength, phase or power of a beam generated by a modeling light source may be further included at the back of the output stage of the modeling light. The light modulation unit 17 may perform a function for changing the wavelength of the original beam in order to obtain a modeling beam of a specific wavelength necessary for the curing or sintering of a modeling material, a function for modulating the phase of output of each modeling light source if a modeling beam is generated by composing the outputs of a plurality of modeling light sources, a function for receiving output of a modeling light source and adjusting the size of the output without changing the size of an electric current input to the modeling light source (this means that the output is the same), and the function of a shutter which regulates (switches) the output of a modeling light source. Through the application of such a light modulation unit, a general-purpose modeling light source can be used and the final output having a desired wavelength/power/phase can be customized.

Figure 2:
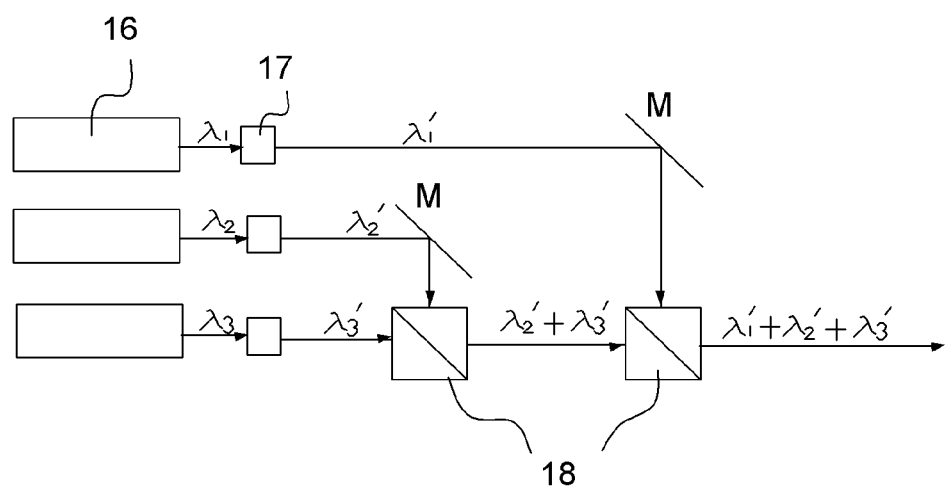
FIG. 2 is a schematic diagram illustrating that a plurality of modeling beams having different wavelengths are composed using a multiplexer 18.
Figure 3:
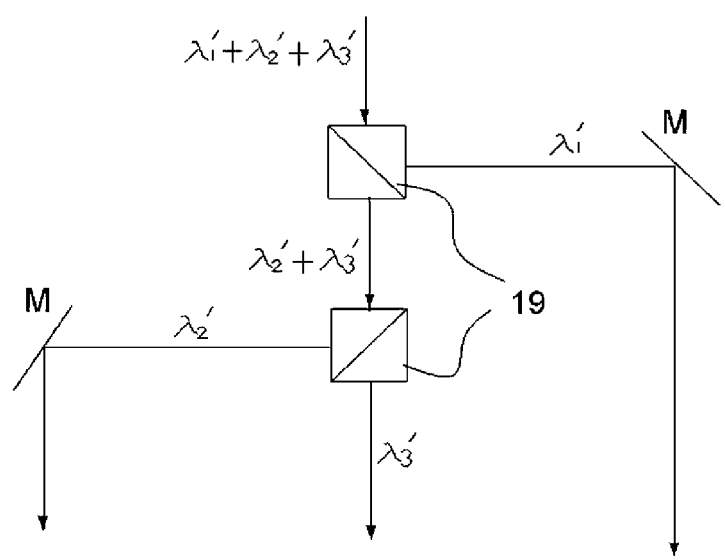
FIG. 3 is a schematic diagram illustrating that a composed beam is separated into a plurality of modeling beams using a demultiplexer 19.

Furthermore, the modeling light source unit 15 may further include a multiplexer 18 having a function for generating a composed beam and a demultiplexer 19 having a function for splitting a composed beam by wavelength band. Such a configuration may be valid if a plurality of (N) modeling light sources having different wavelengths is applied or if a plurality of modeling beams having different wavelengths has been generated through the aforementioned light modulation unit 17. In order to have the output of a modeling light source incident on the light guide unit to be described later, N beams need to be induced to a predetermined location of the light guide unit. To this end, a plurality of slightly complicated optical elements—a mirror, a lens, etc. is required. Accordingly, a reduction in the size of a head assembly may be difficult. If the multiplexer 18 and the demultiplexer 19 are applied, however, the size of the head assembly itself can be reduced because modeling light sources may be separately modulated and located outside the head assembly and thus some of the optical elements may be omitted. The modeling light source unit 15 including the multiplexer 18 or the demultiplexer 19 may also be applied to the B type light guide unit B in addition to the A type light guide unit A to be described later. Embodiments of the multiplexer 18 and the demultiplexer 19 are shown in FIGS. 2 and 3.

Furthermore, if N modeling beams, that is, output of the demultiplexer 19, may be synchronized or made simultaneous, N three-dimensional modeling products can be generated at the same. An example of mutual simultaneousness is a method for composing all of the modeling beams of a first channel to an N-th channel in all of time intervals when the multiplexer 18 generates a composed beam. In this case, N models are started and ended at the same time, and all of middle processes are performed at the same time. Mutual synchronization is to place a time lag in each channel when the multiplexer 18 generates a composed beam. An example of mutual synchronization is to use a method for composing the modeling beams of a first channel in a first time interval, the modeling beams of a second channel in a second time interval, and the modeling beams of a third channel in a third time interval. In this case, a method for containing a piece of line scan information or containing a piece of modeling plane information in each time interval may be used. Even in such a method, N models can be started or ended almost at the same time. In particular, assuming that some curing or sintering time between line scans or between modeling planes is taken, a modeling speed may not be significantly lower than simultaneous modeling.

The A type light guide unit A and the B type light guide unit B are hereinafter proposed as an embodiment of the light guide unit (N may be hereinafter a specific natural number of 2 or more).

Figure 4:
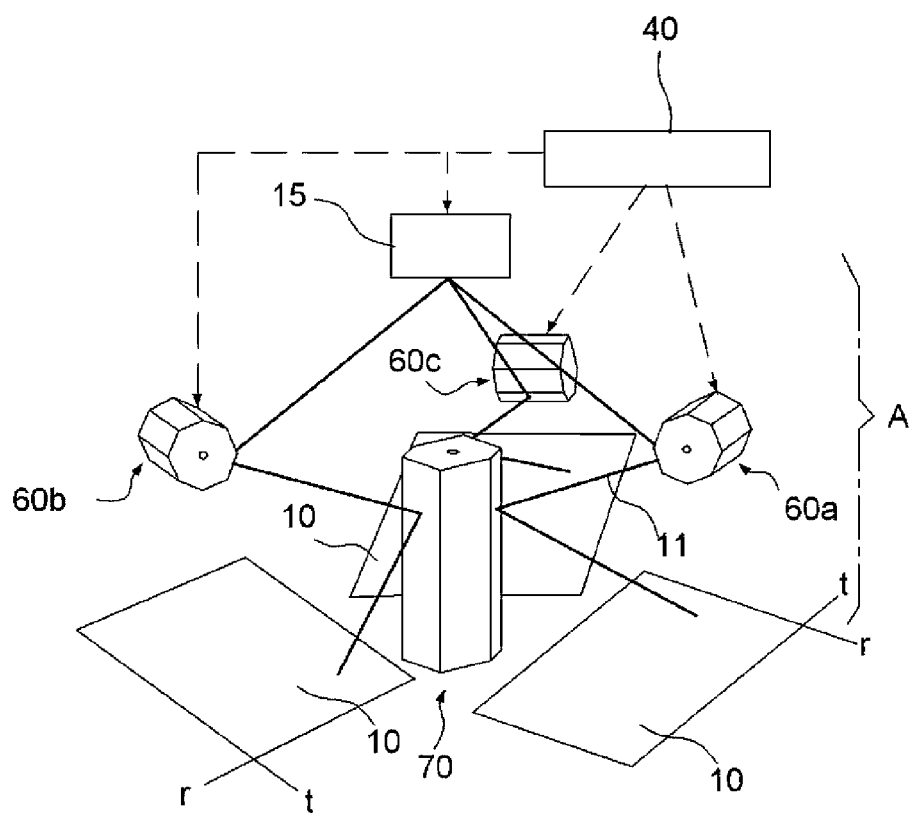
FIG. 4 is an embodiment of a multi-channel head assembly of the present invention and is a schematic diagram showing a configuration capable of modeling three three-dimensional modeling products and of allowing a plurality of first light reflection units to share a second light reflection unit 70.

An embodiment (N=3) of the A type light guide unit A is shown in FIG. 4. The A type light guide unit A includes (1-1)-th to (1-N)-th light reflection units 60a, 60b, 60c (N=3) having a function for making N modeling beams, respectively, incident on a second light reflection unit 70 by primarily reflecting the N modeling beams and the second light reflection unit 70 having a function for making the N modeling beams incident on N modeling planes, respectively, by secondarily reflecting the N modeling beams received from the (1-1)-th to (1-N)-th light reflection units 60a, 60b, 60c (N=3). The elements continuously determine the locations where modeling beams are radiated with respect to time so that a lost portion is not generated in scanning for the modeling plane 10. Furthermore, in the configuration of the elements on the space, it is advantageous in terms of space effectiveness—a reduction of a head assembly—if the second light reflection unit 70 is placed at the center and the (1-1)-th to (1-N)-th light reflection units 60a, 60b, 60c (N=3) are spaced apart and located at specific angles around the second light reflection unit 70. For example, if three modeling channels are configured, the second light reflection unit 70 may be placed at the center and the (1-1)-th light reflection unit, the (1-2)-th light reflection unit and the (1-3)-th light reflection unit may be disposed at 120 degrees around the second light reflection unit 70.

Furthermore, each of the (1-1)-th to (1-N)-th light reflection units 60a, 60b, 60c (N=3) includes each of (1-1)-th to (1-N)-th polygon reflectors 61a, 61b, 61c (N=3) that has a specific number of light reflection surfaces on its side and rotates around a specific rotating axis. The rotating axis of each of the (1-1)-th to (1-N)-th polygon reflectors 61a, 61b, 61c (N=3) is disposed in parallel to the N modeling planes. The second light reflection unit 70 includes a second polygon reflector 71 that has a specific number of light reflection surfaces on its side and rotates around a specific rotating axis. The rotating axis of the second polygon reflector 71 may be disposed perpendicular to the N modeling planes. Such a proposal is for implementing a required function using minimum elements. To configure a more complicated configuration by changing and modifying some of the configuration using other optical elements, such as a reflection mirror and a prism, may be said to fall within the same to equivalent range of the configuration of the present invention. The polygon reflector needs to be configured so that a shape of a cross section vertical to the rotating axis becomes a polygon and a side surface reflects a modeling beam. More preferably, if a polygon reflector having a sectional shape of a regular polygon is adopted, it is advantageous because the rotation speed and rotation direction of the polygon reflector can be precisely controlled. The cross section of the polygon reflector may be a square, a regular pentagon, a regular hexagon or a regular octagon, but is not limited thereto. As will be described later, one line scan is performed by one side reflection surface of a polygon reflector. Accordingly, there is an advantage in that the length of a line scan can be increased as the number of variables of a regular polygon in the cross section of the polygon reflector is reduced (for example, a square). However, there is a disadvantage in that the rotation speed of the polygon reflector needs to be increased in order to generate the same modeling speed because the displacement of the rotation angle of the polygon reflector needs to be increased to perform one line scan. Accordingly, it is necessary to comprise such an advantage and disadvantage by selecting a polygon reflector of a proper shape depending on the size of the modeling plane 10. Furthermore, the reflection surfaces of the side may be rectangles or trapezoids having the same shape and size. In this case, an overall shape of the polygon reflector may be a regular polyprism or a regular polypyramid.

Figure 5:
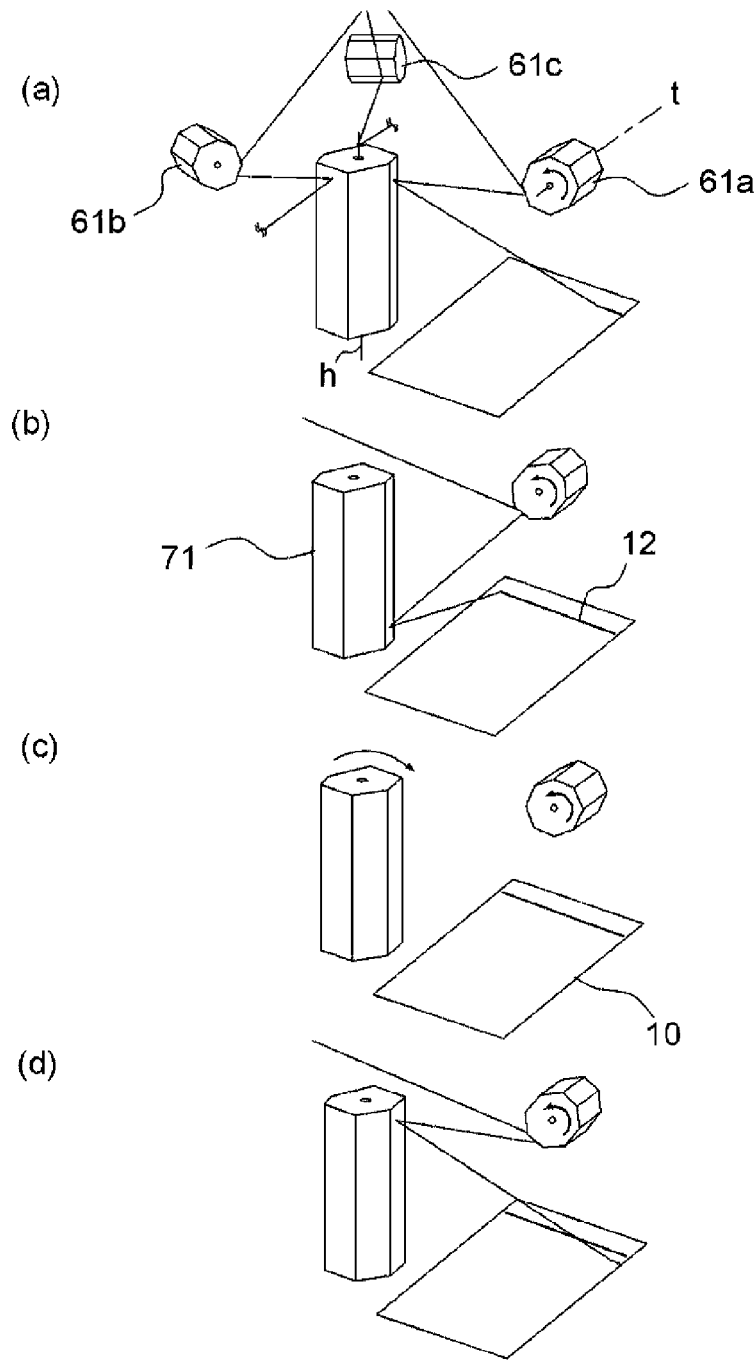
FIG. 5 is an embodiment of a method of performing scanning using the multi-channel head assembly of the present invention and is an explanatory diagram showing an A-1 scanning pattern.

A scanning pattern for each of the N modeling planes may be a pattern (an (A-1)-th scanning pattern) formed as each of a plurality of times of line scans having a direction parallel to a direction (a radius direction) from the location of the second light reflection unit 70 to the location of each of the (1-1)-th to (1-N)-th light reflection units 60a, 60b, 60c (N=3) is stepped at a specific interval in a direction (a tangent direction) perpendicular to the radius direction. An embodiment related to the scanning pattern is shown in FIG. 5. In this case, the plurality of times of line scans in the direction parallel to the radius direction is performed as each of the (1-1)-th to (1-N)-th polygon reflectors 61a, 61b, 61c (N=3) rotates, and the stepping at the specific interval in the tangent direction may be performed as the second polygon reflector 71 rotates. If the value of the stepping interval is too small, it is inefficient because a modeling beam is again radiated to a portion which has been subjected to a line scan and has already been cured. If the value of the stepping interval is too great, the generation of a portion to which a modeling beam has not been radiated needs to be taken into consideration. As described above, one line scan is performed by a side reflection surface of each of the (1-1)-th to (1-N)-th polygon reflectors 61a, 61b, 61c (N=3) whose incident angles of modeling beams continue to change while rotating. Accordingly, if the (1-1)-th to (1-N) polygon reflectors continue to rotate in a single direction, control while the modeling beam goes on from one side reflection surface to the other side reflection surface neighboring the one side reflection surface may be performed by making off the output of the modeling light source unit 15 or blocking the modeling beam using an additional element, such as a shutter, or using a method using a blocking film disposed near the modeling plane. A method for lowering the output of the modeling beam to the extent that the curing or sintering action of a modeling material is not generated although the modeling beam is incident on the modeling plane may be taken into consideration.

Furthermore, if the (1-1)-th to (1-N)-th polygon reflectors 61a, 61b, 61c (N=3) alternately rotate forward and backward, only one side reflection surface of each of the (1-1)-th to (1-N)-th polygon reflectors 61a, 61b, 61c (N=3) is used in all of line scans, but such a configuration is not preferred. This is described later.

A method for scanning a plurality of modeling planes in the (A-1)-th scanning pattern is described in detail. To this end, it is a premise that a modeling material has been actually supplied and located in the modeling plane 10. After the scanning of a modeling beam for one modeling plane 10 is completed, one modeling layer is formed. Such modeling layers are stacked to form one three-dimensional modeling product. In the scanning of the modeling plane 10, a portion to which the modeling beam has not been radiated should not be present. It is preferred that scanning is performed through an optimal path capable of minimizing the time taken for the scanning.

First, the (1-1)-th to (1-N)-th polygon reflectors 61a, 61b, 61c (N=3) rotate in a single direction and the modeling light source unit 15 starts to have a modeling beam incident on the (1-1)-th to (1-N)-th polygon reflectors 61a, 61b, 61c (N=3). Second, while the polygon reflectors of respective first light reflection units continue to rotate at a specific speed, modeling beams primarily reflected by the polygon reflectors of the respective first light reflection units are secondarily reflected by the polygon reflector of the second light reflection unit 70. Thereafter, a line scan is performed on the modeling plane 10 in the direction parallel to the radius direction. Third, each of N modeling beams is controlled so that it is not radiated to N modeling planes 10, thereby terminating the line scan. Fourth, after the line scan, in order to perform a next line scan after stepping at a specific interval in the tangent direction, the second polygon reflector 71 rotates at a specific angular displacement, and the (1-1)-th to (1-N)-th polygon reflectors continue to rotate in the same direction until a next reflection surface neighboring a previous reflection surface reaches a specific location. In this case, if the rotation of the second polygon reflector 71 and the rotation of the (1-1)-th to (1-N)-th polygon reflectors 61a, 61b, 61c (N=3) are performed at the same time, a total modeling time can be reduced. Fifth, the first step to the fourth step are repeatedly performed until the radiation of the modeling beam to the entire surface of each of the N modeling planes 10 is completed.

In such a method, it is preferred that the (1-1)-th to (1-N)-th polygon reflectors 61a, 61b, 61c (N=3) rotate only in a specific one direction. If the (1-1)-th to (1-N)-th polygon reflectors 61a, 61b, 61c (N=3) rotate only in a single direction as described above, the time taken between one line scan and a next line scan can be minimized and the time taken to accelerate the (1-1)-th to (1-N)-th polygon reflectors 61a, 61b, 61c (N=3) from a stop state can also be minimized. Accordingly, a total time taken for modeling can be reduced. The (1-1)-th to (1-N)-th polygon reflectors 61a, 61b, 61c (N=3) may be configured to alternately rotate forward and backward, but a practical profit using the present invention is reduced because the time taken for each line scan is increased as the forward rotation-stop-backward rotation-stop process is repeated under such a configuration. Furthermore, an electric motor element for driving becomes more complicated, and a good possibility that more severe vibration and noise may be generated in the repeated process must be taken into consideration. It is evident that the second polygon reflector 71 needs to continue to rotate in a single direction in a process of performing scanning on one modeling plane 10. However, when a next modeling plane 10 is scanned after scanning for one modeling plane 10 is completed, the second polygon reflector 71 may rotate in the same direction as a rotation direction in a process of scanning a previous modeling plane 10 or may rotate in a direction opposite a rotation direction in a process of scanning a previous modeling plane 10. The reason for this is that a problem, such as that in the (1-1)-th to (1-N)-th polygon reflectors 61a, 61b, 61c (N=3), is not generated because the second polygon reflector 71 needs to be in the stop state while the line scan is performed. In the latter case, however, the second polygon reflector 71 does not need to be necessarily configured using a reflector (mirror) of a polygon form.

Figure 6:
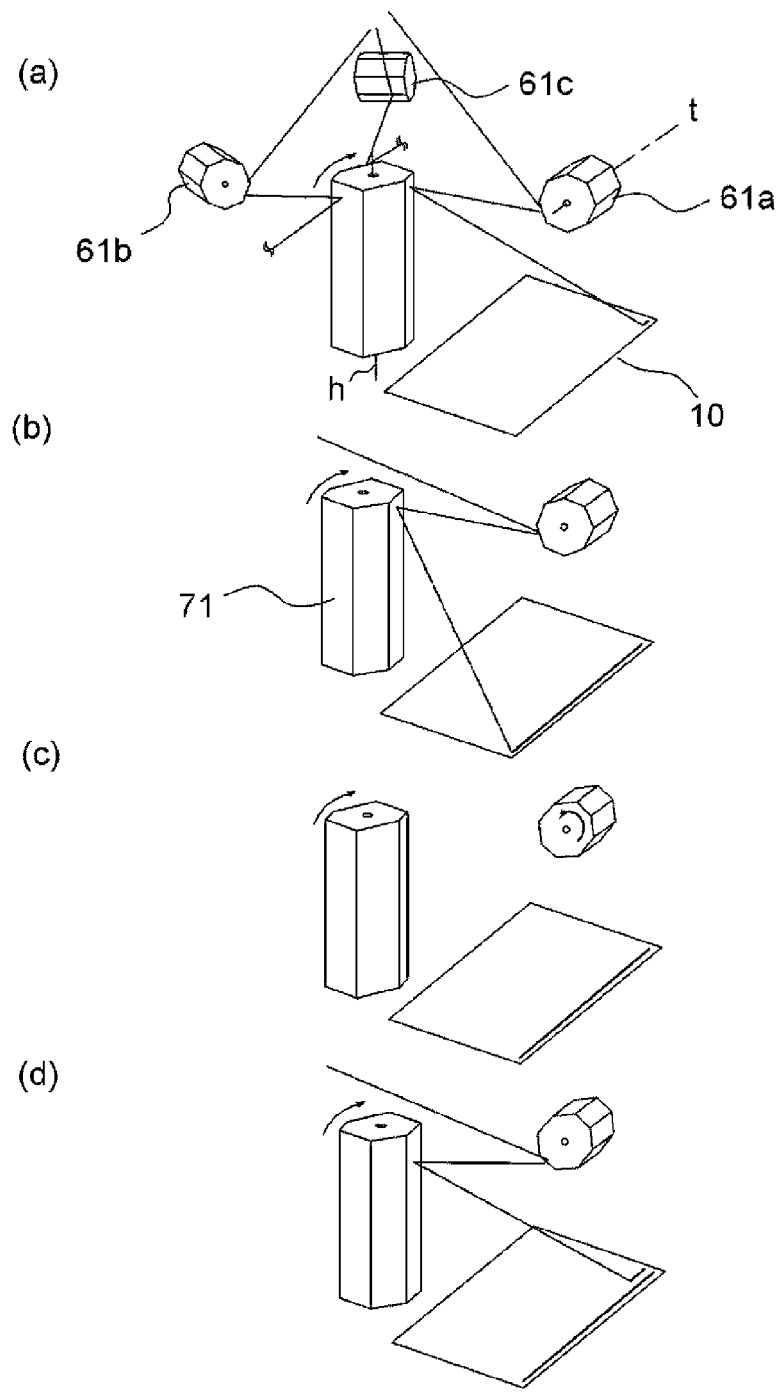
FIG. 6 is an embodiment of a method of performing scanning using the multi-channel head assembly of the present invention and is an explanatory diagram showing an A-2 scanning pattern.

Furthermore, a scanning pattern for each of the N modeling planes may be a pattern (an (A-2)-th scanning pattern) in which a plurality of times of line scans is performed in the direction (the tangent direction) perpendicular to the radius direction with stepping at a specific interval in the direction parallel to the direction (the radius direction) from the location of the second polygon reflector 71 to the location of each of the (1-1)-th to (1-N)-th polygon reflectors 61*a*, 61*b*, 61*c* (N=3). This is shown in FIG. 6. In this case, the plurality of times of line scans in the direction parallel to the tangent direction may be performed as the second polygon reflector 71 rotates, and the stepping at the specific interval in the radius direction may be performed as the (1-1)-th to (1-N)-th polygon reflectors 61*a*, 61*b*, 61*c* (N=3) rotate. As described above, one line scan is performed by a side reflection surface of the second polygon reflector 71 whose incident angle of a modeling beam continues to change while the second polygon reflector 71 rotates. Accordingly, if the second polygon reflector 71 continues to rotate in a single direction, control while the modeling beam goes on from one side reflection surface to the other side reflection surface neighboring the one side reflection surface may be performed by making off the output of the modeling light source unit 15 or blocking the modeling beam using an additional element, such as a shutter, or using a method using a blocking film disposed near the modeling plane. A method for lowering the output of the modeling beam to the extent that the curing or sintering action of a modeling material is not generated although the modeling beam is incident on the modeling plane may be taken into consideration.

Furthermore, if the second polygon reflector 71 alternately rotates forward and backward, only one side reflection surface of the second polygon reflector 71 is used in all of line scans, but such a configuration is not preferred. This is described later.

A method for scanning a plurality of modeling planes in the (A-2)-th scanning pattern is described in detail. First, the second polygon reflector 71 rotates in a single direction, and the modeling light source unit 15 starts to have a modeling beam incident on the (1-1)-th to (1-N)-th polygon reflectors 61*a*, 61*b*, 61*c* (N=3). Second, while the second polygon reflector continues to rotate at a specific speed, a modeling beam primarily reflected by each of the (1-1)-th to (1-N)-th polygon reflectors 61*a*, 61*b*, 61*c* (N=3) is secondarily reflected by the second polygon reflector 71 and then performs a line scan on the modeling plane 10 in the direction parallel to the tangent direction. Third, each of N modeling beams is controlled so that it is not scanned to N modeling planes 10, thereby terminating the line scan. Fourth, after the line scan is performed, in order to perform a next line scan after stepping at a specific interval in the radius direction, each of the (1-1)-th to (1-N)-th polygon reflectors 61*a*, 61*b*, 61*c* (N=3) rotates at a specific angular displacement. The second polygon reflector 71 continues to rotate in the same direction until a next reflection surface neighboring a previous reflection surface reaches a specific location. In this case, if the rotation of the second polygon reflector 71 and the rotation of the (1-1)-th to (1-N)-th polygon reflectors 61*a*, 61*b*, 61*c* (N=3) are performed at the same time, a total modeling time can be reduced. Fifth, the first step to the fourth step are repeatedly performed until the radiation of the modeling beam to the entire surface of each of the N modeling planes 10 is completed.

In such a method, it is preferred that the second polygon reflector 71 rotates only in a specific one direction. If the second polygon reflector 71 rotates only in a single direction as described above, the time taken between one line scan and a next line scan can be minimized and the time that taken to accelerate the second polygon reflector 71 from a stop state can also be minimized. Accordingly, a total time taken for modeling can be reduced. In this case, the second polygon reflector 71 may be configured to alternately rotate forward and backward, but a practical profit using the present invention is reduced because the time taken for each line scan is increased as the forward rotation-stop-backward rotation-stop process is repeated under such a configuration. Furthermore, an electric motor element for driving becomes more complicated, and a good possibility that more severe vibration and noise may be generated in the repeated process must be taken into consideration. It is evident that the (1-1)-th to (1-N)-th polygon reflectors 61*a*, 61*b*, 61*c* (N=3) need to continue to rotate in a single direction in a process of performing scanning on one modeling plane 10. However, when a next modeling plane 10 is scanned after scanning for one modeling plane 10 is completed, the (1-1)-th to (1-N)-th polygon reflectors 61*a*, 61*b*, 61*c* (N=3) may rotate in the same direction as a rotation direction in a process of scanning a previous modeling plane 10 or may rotate in a direction opposite a rotation direction in a process of scanning a previous modeling plane 10. The reason for this is that a problem, such as that in the second polygon reflector 71, is not generated because the (1-1)-th to (1-N)-th polygon reflectors 61*a*, 61*b*, 61*c* (N=3) need to be in the stop state while the line scan is performed. In the latter case, however, each of the (1-1)-th to (1-N)-th polygon reflectors 61*a*, 61*b*, 61*c* (N=3) does not need to be essentially configured using a reflector (mirror) of a polygon form.

The control unit 40 functions to control the modeling light source unit 15 and the light guide unit by interlocking.

Specifically, the control unit 40 functions to control the modeling light source unit 15, the (1-1)-th to (1-N)-th light reflection units 60*a*, 60*b*, 60*c* (N=3), and the second light reflection unit 70 by interlocking. More specifically, in the case of multi-modeling according to the (A-1)-th scanning pattern and the (A-2)-th scanning pattern, the driving of the (1-1)-th to (1-N)-th polygon reflectors 61*a*, 61*b*, 61*c* (N=3) and the second polygon reflector 71, on/off of N modeling beams, and an output value become objects to be controlled by interlocking. The location where a modeling beam is to be radiated may be specified with respect to each of N modeling planes 10 depending on control of the rotation angle of each of the (1-1)-th to (1-N)-th polygon reflectors 61*a*, 61*b*, 61*c* (N=3) and the second polygon reflector 71. A modeling layer may be formed by controlling on/off of each of N modeling beams based on information about an image of the modeling layer at the specified scan location. The control unit 40 basically includes a processing unit which generates a proper control signal with respect to a control variable and a driving unit which generates the driving of a corresponding element by processing the control signal generated by the processing unit. The processing unit may be implemented in hardware, such as a circuit, or may be configured in software, such as a program. On/off control of a modeling beam may adopt a configuration which controls on/off of a modeling beam generation element—an LD or a VCSEL—, and may be implemented by controlling additional elements, such as a shutter for selectively transmitting or blocking a modeling beam generated by the modeling beam generation element over time, but is not limited to such a configuration. Specifically, control of the output value of a modeling beam includes controlling the amplitude of a pulse or the frequency of a pulse that forms the modeling beam. This is necessary to correct a difference between the output densities of modeling beams at respective points, which is caused due to a difference in the length of a light path necessary for the modeling beam to reach each point that forms the modeling plane 10 or a difference in the incident angle of the modeling beam. This is described in detail below. When a modeling beam is vertically incident on the modeling plane 10, the output density of the modeling beam is increased because an incident area becomes a minimum. In contrast, if a modeling beam is incident on the modeling plane 10 at an oblique angle, output density of the modeling beam is reduced because an incident area is increased. The degree of a curing—photo curing or powder sintering—action of a modeling beam for a modeling material, is proportional to the size of output density of the modeling beam. Accordingly, such control of the output value of the modeling beam is necessary to secure quality of a modeling layer by guaranteeing uniform output density of the modeling beam with respect to the entire area of the modeling plane 10. Furthermore, in particular, if the head assembly of the present invention is enlarged, it is necessary to correct the degree of loss of energy of a modeling beam, which may vary depending on the length of a light path that is necessary for the modeling beam to reach each point that forms the modeling plane 10.

Control of the (1-1)-th to (1-N)-th polygon reflectors 61a, 61b, 61c (N=3) and the second polygon reflector 71 by the control unit 40 is basically rotation control. Major control variables include the rotation angular velocity, rotation angular displacement and rotation angular acceleration of a polygon mirror. It is necessary to perform tracking in the state in which such control variables have a small error within a small lead time with respect to the control signal of the control unit 40. To this end, it is preferred that an electric control method is used. More preferably, an electric servomotor capable of implementing a rotation angular velocity, a rotation angular displacement and a rotation angular acceleration in response to a control signal (electrical signal) that varies over time may be used, but is not limited thereto.

Furthermore, the control unit 40 may further include a first photosensor unit 41 having a function for determining start timing of each of a plurality of times of line scans in the radius direction or the direction parallel to the tangent direction by sensing a modeling beam incident on a specific point and for synchronizing the driving of the modeling light source unit 15 and the driving of the (1-1)-th to (1-N)-th polygon reflectors 61a, 61b, 61c (N=3) or the second polygon reflector 71 in controlling the driving of the (1-1)-th to (1-N)-th polygon reflectors 61a, 61b, 61c (N=3) and the second polygon reflector 71 described above. An embodiment of the first photosensor unit 41 is shown in FIG. 7(a). In the '(A-1)-th scanning pattern', the (1-1)-th to (1-N)-th polygon reflectors 61a, 61b, 61c (N=3) perform a line scan while rotating in a single direction. Points at which modeling beams reflected by the (1-1)-th to (1-N)-th polygon reflectors 61a, 61b, 61c (N=3) are incident on the side (reflection surface) of the second polygon reflector 71 may be formed from the top to the bottom. Right before a next line scan is started after one line scan is terminated, the reflection of a modeling beam on the top of the second polygon reflector 71 and the installation of the first photosensor unit 41 in a corresponding path are taken into consideration. It is preferred that the number of photosensors forming the first photosensor unit is the same as the number of channels of a modeling beam. In the embodiment, the (1-1)-th to (1-N)-th polygon reflectors 61a, 61b, 61c (N=3) are elements responsible for a line scan. Accordingly, the (1-1)-th to (1-N)-th polygon reflectors 61a, 61b, 61c (N=3) and the modeling light source unit 15 is the subject of synchronization control by the first photosensor unit 41. In a configuration (e.g., the (A-2)-th scanning pattern) in which the second polygon reflector 71 is an element responsible for a line scan, however, the second polygon reflector 71 and the modeling light source unit 15 will be the subject of synchronization control by the first photosensor unit 41.

FIG. 7(b) shows an embodiment of a configuration in which the edge of the second polygon reflector 71 is tempered to have an inclined plane having a specific tilt angle and a modeling beam reflected by the inclined plane is sensed. In the (A-1)-th scanning pattern, the second polygon reflector 71 experiences an angular displacement at a specific angle. Accordingly, in order to continue to sense a modeling beam reflected by the tempering inclined plane for each line scan, a plurality of photosensors needs to be disposed in an array form in the first photosensor unit 41 as shown in FIG. 7(b). It is preferred that the number of arrays forming the first photosensor unit is the same as the number of channels of a modeling beam.

The output signal of the first photosensor unit 41 may be transferred to the processing unit and may determine start timing of a line scan. The modeling light source unit 15 and the (1-1)-th to (1-N)-th polygon reflectors 61a, 61b, 61c (N=3) or the second polygon reflector 71 may be synchronized using the start timing. The control unit 40 may perform control through precise control of only the angular displacement of the (1-1)-th to (1-N)-th polygon reflectors 61a, 61b, 61c (N=3) or the second polygon reflector 71. If a process error and response delay inherent in a mechanical element, such as a servo motor, are taken into consideration, an effect of correcting such an error can be obtained through an additional element, such as the first photosensor unit 41. In conclusion, the (1-1)-th to (1-N)-th polygon reflectors 61a, 61b, 61c (N=3) or the second polygon reflector 71 and the modeling light source unit 15 may be driven to operate in conjunction with each other by the driving signal of the (1-1)-th to (1-N)-th polygon reflectors 61a, 61b, 61c (N=3) or the second polygon reflector 71 and the driving signal of the modeling light source unit 15, which are generated after the control unit 40 processes the driving signals including the generation signal of the first photosensor 41.

Furthermore, the control unit 40 may further include a fourth photosensor 44 having a function for determining end timing of each of a plurality of times of line scans in a direction parallel to the radius direction or the tangent direction by sensing a modeling beam incident on a specific point and for synchronizing the driving of the modeling light source unit 15 and the driving of the (1-1)-th to (1-N)-th polygon reflectors 61a, 61b, 61c (N=3) or the second polygon reflector 71. For example, FIG. 7(c) shows an embodiment of a configuration in which the fourth photosensor 44 is further selectively disposed under the second polygon reflector 71 in order to determine end timing of each line scan. It is preferred that the number of photosensors forming the fourth photosensor unit is the same as the number of channels of a modeling beam.

Figure 8:
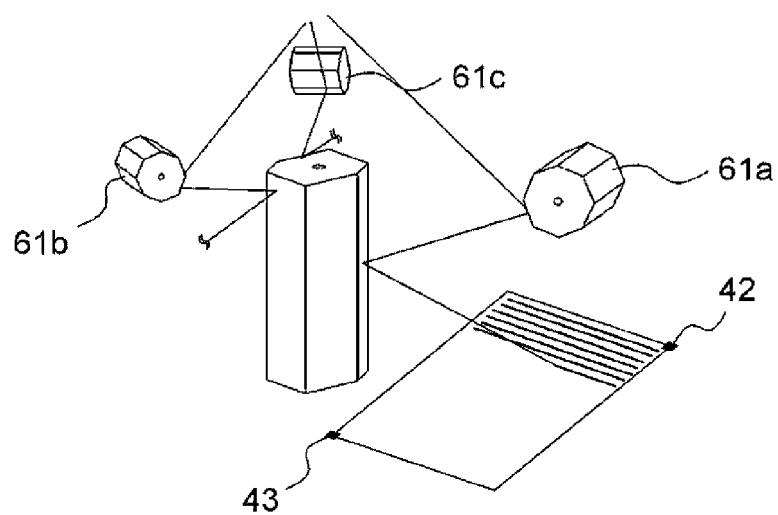
FIG. 8 is an explanatory diagram showing an embodiment of a second photosensor unit and a third photosensor unit in the multi-channel head assembly of the present invention.

Furthermore, the control unit 40 may further include a second photosensor unit 42 having a function for determining first start timing of a modeling beam radiated to each of N modeling planes 10 by sensing the modeling beam incident on a specific location of each of the N modeling planes 10 and for synchronizing the driving of the modeling light source unit 15 and the driving of the (1-1)-th to (1-N)-th polygon reflectors 61a, 61b, 61c (N=3) or the second polygon reflector 71. Furthermore, a third photosensor unit 43 having a function for determining the final end timing of a modeling beam radiated to each of the N modeling planes 10 by sensing the modeling beam incident on a specific location of each of the N modeling planes 10 may be further selectively disposed. In fully scanning one modeling plane 10, the final end timing of the first start timing has a direct relation with the driving of an element that belongs to the (1-1)-th to (1-N)-th polygon reflectors 61*a*, 61*b*, 61*c* (N=3) and the second polygon reflector 71 and that is responsible for the stepping of each line scan. FIG. 8 shows an embodiment of the second photosensor unit 42 and the third photosensor unit 43. The first start timing and the final end timing in the radiation (scanning) of a modeling beam to the modeling plane 10 are determined by the second photosensor unit 42 and the third photosensor unit 43. In this case, since the second light reflection unit 70 (second polygon reflector 71) is an element responsible for the stepping of a line scan, the second light reflection unit 70 and the modeling light source unit 15 are driven in conjunction with each other by the driving signal of the second light reflection unit 70 and the driving signal of the modeling light source unit, which are generated after the processing unit receives the signals of the second photosensor unit 42 and the third photosensor unit 43 and processes the received signals. It is preferred that the number of photosensors forming each of the second photosensor unit and the third photosensor unit is the same as the number of channels of a modeling beam.

Figure 9:
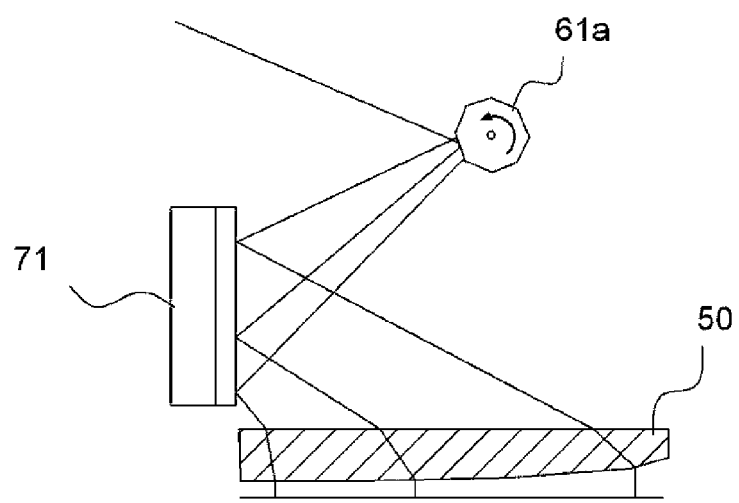
FIG. 9 is a cross-sectional view showing an embodiment of a modeling light incident angle correction unit of the present invention.

Furthermore, the multi-channel head assembly of three-dimensional modeling equipment of the present invention may further include a modeling light incident angle correction unit 50 having a function for having a modeling beam vertically incident on the modeling plane 10 in all of points that form the modeling plane 10. This is for making uniform the output density of a modeling beam in each incident point as described above. The modeling light incident angle correction unit 50 in the embodiment shown in FIG. 9 is a lens disposed over the modeling plane 10, and functions to induce a modeling beam to be vertically incident on the modeling plane 10 after twice reflection processes although the modeling beam secondarily reflected by the second light reflection unit 70, 30 has a different incident angle at each point. An embodiment of the modeling light incident angle correction unit 50 is shown in FIG. 9.

The B type light guide unit B is described below.

Figure 10:
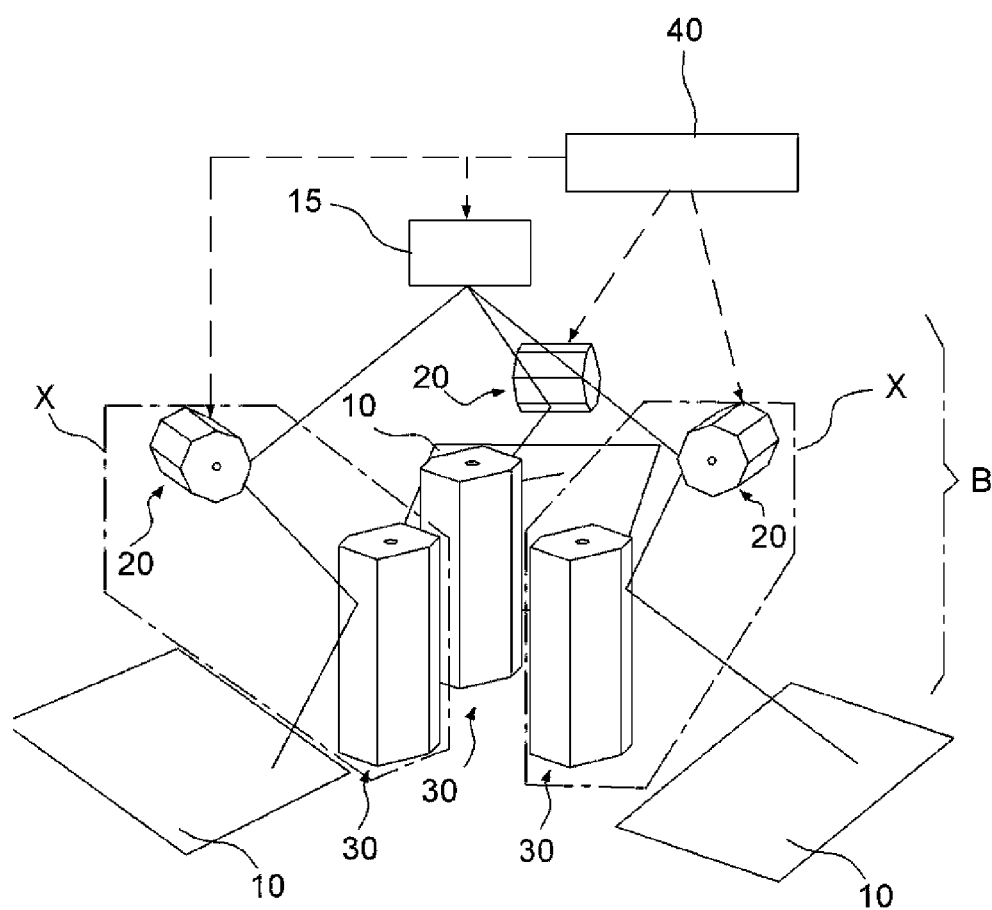
FIG. 10 is an embodiment of the multi-channel head assembly of the present invention and is a perspective view showing a configuration which can model three three-dimensional modeling products and includes a plurality of light guide modules X.

An embodiment (N=3) of the B type light guide unit B is shown in FIG. 10. The B type light guide unit B includes a first light guide unit 20 which includes N light guide modules each disposed at a specific location over one of N modeling planes 10 and which has a function for receiving one of N modeling beams and having the received modeling beam incident on a second light guide unit 30 by primarily reflecting the received modeling beam and the second light guide unit 30 which is disposed at a specific location over one of the N modeling planes and which has a function for having a modeling beam, incident from the first light guide unit 20, incident on one of the N modeling planes 10 by secondarily reflecting the incident modeling beam. At least one of the first light guide unit 20 and the second light guide unit 30 includes a polygon mirror having a specific number of light reflection surfaces on its side and rotating in a single direction around a specific rotating axis.

Each of the N light guide modules may be responsible for the channels of a modeling beam having different wavelengths or may be responsible for the channels of a modeling beam having the same wavelength. In the latter case, all of generated three-dimensional modeling products do not need to have the same shape. In the former case, all of generated three-dimensional modeling products do not need to have different shapes.

If the B type light guide unit B is applied, the control unit has a complex function for controlling the modeling light source unit 15 and each of the N light guide modules by interlocking and controlling the driving of the modeling light source unit 15, the first light guide unit and the second light guide unit by interlocking with respect to each of the N light guide modules.

A first axis 1, a second axis 2 and a third axis 3 are criteria in describing the scanning direction and pattern of a modeling beam for a modeling plane 10 to be described later or the position relation of the rotating axis of a polygon mirror. The third axis 3 is an axis perpendicular to both the first axis 1 and the second axis 2. The first axis 1 and the second axis 2 are randomly located on an actual modeling plane 10.

The first light guide unit 20 and the second light guide unit 30 are located in the space over the modeling plane 10 so that they are not parallel to each other. The elements consecutively determine the location to which a modeling beam is radiated with respect to time so that a lost portion is not generated in the scanning of the modeling plane 10. From a viewpoint of a modeling beam, a modeling beam from a modeling light source unit 15 is primarily reflected by the first light guide unit 20, incident on the second light guide unit 30, secondarily reflected by the second light guide unit 30 and then incident on the modeling plane 10. The present invention proposes that one or more of the first light guide unit 20 and the second light guide unit 30 include a polygon mirror having a specific number of light reflection surfaces on its side and rotating in a single direction around a specific rotating axis. The polygon mirror needs to be configured so that a shape of a cross section vertical to the rotating axis is a polygon and a side surface can reflect a modeling beam. More preferably, if a polygon mirror having a sectional shape of a regular polygon is adopted, it is advantageous because the rotation speed and rotation direction of the polygon mirror can be precisely controlled. The cross section of the polygon mirror may be a square, a regular pentagon, a regular hexagon or a regular octagon, but is not limited thereto. As will be described later, one line scan is performed by one side reflection surface of the polygon mirror. Accordingly, there is an advantage in that the length of a line scan can be increased as the number of variables of a regular polygon in the cross section of the polygon mirror is reduced (for example, a square). However, there is a disadvantage in that the rotation speed of the polygon mirror needs to be increased in order to generate the same modeling speed because a rotation angle displacement of the polygon mirror needs to be increased to perform one line scan. Accordingly, it is necessary to comprise such an advantage and disadvantage by selecting a polygon mirror of a proper shape depending on the size of the modeling plane 10. Furthermore, the reflection surfaces of the side may be rectangles or trapezoids having the same shape and size. In this case, an overall shape of the polygon mirror may be a regular polyprism or a regular polypyramid. Regarding the angle at which the polygon mirror is installed in the rotating axis and the incident angle of a modeling beam, the polygon mirror may be configured to have any one of a regular polyprism and a regular polypyramid depending on the location between the first light guide unit 20 and the second light guide unit 30 or the size of the head assembly of the present invention. In embodiments of FIGS. 10 to 14, the first light guide unit 20 has been implemented to have a shape of a regular octagon post and the second light guide unit 30 has been implemented to have a shape of a regular hexagon post.

The control unit 40 controls the modeling light source unit 15, the first light guide unit 20 and the second light guide unit 30 by driving them by interlocking. Detailed objects to be controlled may include on/off and the output value of a modeling beam, the driving of the first light guide unit 20 and the second light guide unit 30, etc. A location of the modeling plane 10 where a modeling beam is radiated is specified depending on control of the rotation angles of the first light guide unit 20 and the second light guide unit 30, and a modeling layer may be formed by controlling on/off of the modeling beam based on information about an image of the modeling layer at the specified radiation location. The control unit 40 basically includes a processing unit which generates a proper control signal with respect to a control variable and a driving unit which generates the driving of a corresponding element by processing the control signal generated by the processing unit. The processing unit may be implemented in hardware, such as a circuit, or may be configured in software, such as a program. On/off control of a modeling beam may adopt a configuration which controls on/off of a modeling beam generation element—an LD or a VCSEL—, and may be implemented by controlling additional elements, such as a shutter for selectively transmitting or blocking a modeling beam generated by the modeling beam generation element over time, but is not limited to such a configuration. Specifically, control of the output value of a modeling beam includes controlling the amplitude of a pulse or the frequency of a pulse that forms the modeling beam. This is necessary to correct a difference between the output densities of modeling beams at respective points, which is caused due to a difference in the length of a light path necessary for the modeling beam to reach each point that forms the modeling plane 10 or a difference in the incident angle of the modeling beam. This is described in detail below. When a modeling beam is vertically incident on the modeling plane 10, the output density of the modeling beam is increased because an incident area becomes a minimum. In contrast, if a modeling beam is incident on the modeling plane 10 at an oblique angle, output density of the modeling beam is reduced because an incident area is increased. The degree of a curing—photo curing or powder sintering—action of a modeling beam for a modeling material, is proportional to the size of output density of the modeling beam. Accordingly, such control of the output value of the modeling beam is necessary to secure quality of a modeling layer by guaranteeing uniform output density of the modeling beam with respect to the entire area of the modeling plane 10. Furthermore, in particular, if the head assembly of the present invention is enlarged, it is necessary to correct the degree of loss of energy of a modeling beam, which may vary depending on the length of a light path that is necessary for the modeling beam to reach each point that forms the modeling plane 10.

Control of the first light guide unit 20 and the second light guide unit 30 by the control unit 40 is performed by rotation control of the polygon mirror. Major control variables include the rotation angular velocity, rotation angular displacement and rotation angular acceleration of the polygon mirror. It is necessary to perform tracking in the state in which such control variables have a small error within a small lead time with respect to the control signal of the control unit 40. To this end, it is preferred that an electric control method is used. More preferably, an electric servomotor capable of implementing a rotation angular velocity, a rotation angular displacement and a rotation angular acceleration in response to a control signal (electrical signal) that varies over time may be used, but is not limited thereto.

To implement a specific scanning pattern by disposing the aforementioned major elements in the space is described below. As an example of a scanning pattern, an example in which a plurality of times of line scans is stepped at specific intervals on the modeling plane 10 may be taken into consideration. Such a pattern is for improving the scanning speed as described above. Furthermore, in the scanning pattern, the direction of a line scan and the direction of stepping need to be taken into consideration along with the direction in which a modeling beam is incident. In this case, the direction of a line scan and the direction of stepping are described using the first axis 1, the second axis 2 and the third axis 3 as criteria.

Figure 11:
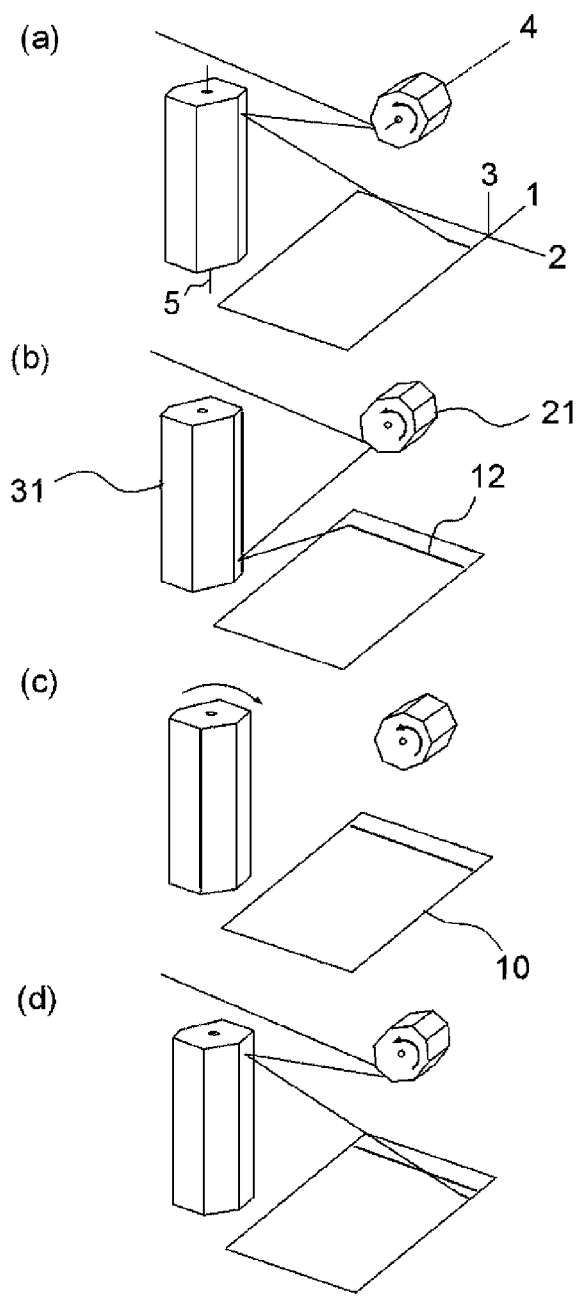
FIG. 11 is a perspective view showing an embodiment ((1-1)-th configuration) of a method for scanning a modeling plane using the multi-channel head assembly of three-dimensional modeling equipment of the present invention.
Figure 14:
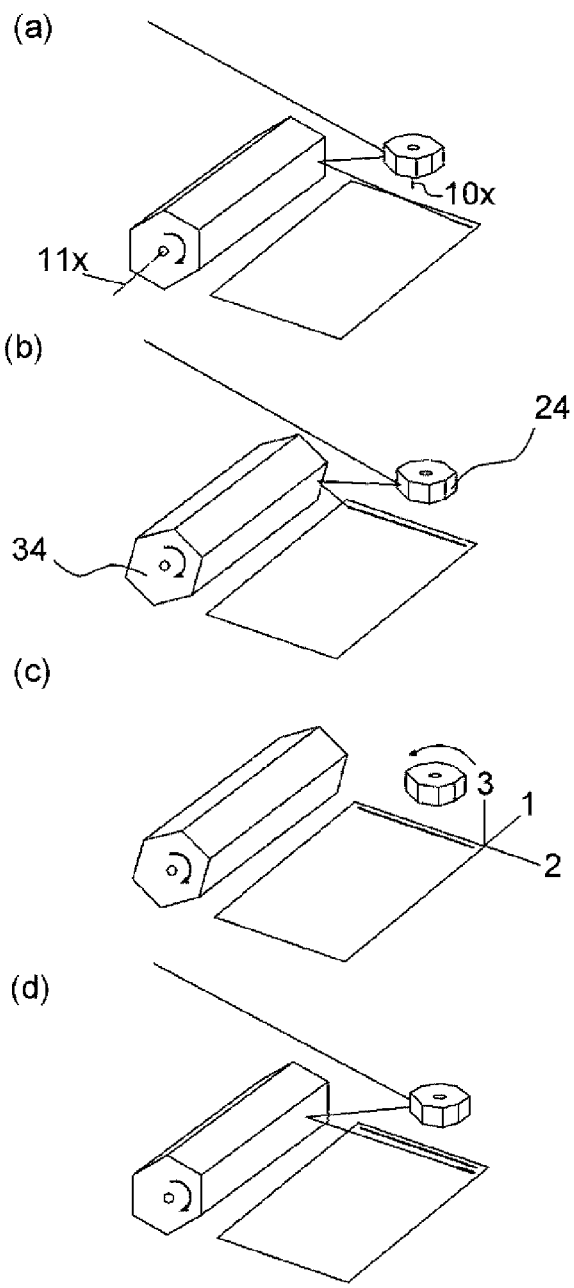
FIG. 14 is a perspective view showing an embodiment ((1-2)-th configuration) of a method for scanning a modeling plane using the multi-channel head assembly of three-dimensional modeling equipment of the present invention.

With respect to each modeling plane including the first axis 1 and the second axis 2 which are perpendicular to the third axis 3 and vertical to each other, each of N modeling beams is incident on the first light guide unit 20 at a specific angle to the second axis 2. A scanning pattern for each of the N modeling planes may be a pattern formed as each of a plurality of times of line scans having a direction parallel to the second axis 2 is stepped at a specific interval in the direction of the first axis 1 (hereinafter referred to as a "first scanning pattern"). FIGS. 11 and 14 show embodiments of the first scanning pattern.

Figure 12:
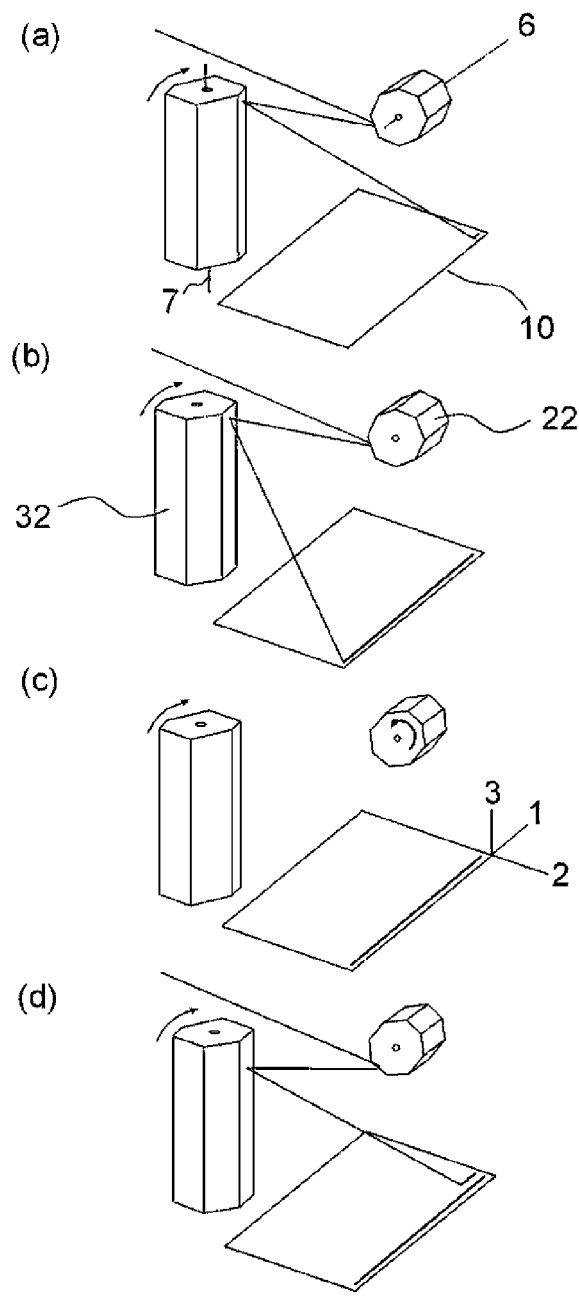
FIG. 12 is a perspective view showing an embodiment ((2-1)-th configuration) of a method for scanning a modeling plane using the multi-channel head assembly of three-dimensional modeling equipment of the present invention.

Furthermore, with respect to each of modeling planes including the first axis 1 and the second axis 2 which are perpendicular to the third axis 3 and vertical to each other, a scanning pattern for each of N modeling planes in which each of N modeling beams is incident on the first light guide unit 20 at a specific angle to the second axis 2 may be a pattern formed as each of a plurality of times of line scans having the direction parallel to the first axis 1 is stepped at a specific interval in the direction of the second axis 2 (hereinafter referred to as a "second scanning pattern"). Embodiments of such a pattern are shown in FIGS. 12 and 13.

A modeling beam in the first scanning pattern and the second scanning pattern may be incident in parallel to the second axis 2 and may be incident in a direction in which the modeling beam is not included in a plane including the second axis 2 and the third axis 3. The direction in which a modeling beam is incident may be determined in relation to the location where the first light guide unit 20 and the second light guide unit 30 are disposed.

Hereinafter, there is proposed a configuration in the space in which major elements, such as the first light guide unit 20, the second light guide unit 30 and the modeling light source unit 15, are disposed in order to implement the first scanning pattern and the second scanning pattern. Such a proposal is for implementing a required function using minimum elements. To configure a more complicated configuration by changing and modifying some of the configuration using other optical elements, such as a reflection mirror and a prism, may be said to fall within the same to equivalent range of the configuration of the present invention.

In order to implement the first scanning pattern, the configuration of two elements is proposed in the head assembly for a three-dimensional modeling equipment of the present invention.

First, with respect to a '(1-1)-th configuration', the first light guide unit 20 includes a first polygon mirror 21. The first polygon mirror 21 is disposed using a fourth axis 4 parallel to the first axis 1 as its rotation center axis. The second light guide unit 30 includes a second polygon mirror 31. The second polygon mirror 31 is disposed using a fifth axis 5 parallel to the third axis 3 as its rotation center axis. A plurality of times of line scans in the direction parallel to the second axis 2 may be performed as the first polygon mirror 21 rotates. Stepping at a specific interval in the direction of the first axis 1 may be performed as the second polygon mirror 31 rotates. If the value of the stepping interval is too small, it is inefficient because a modeling beam is again radiated to a portion which has been subjected to a line scan and has already been cured. If the value of the stepping interval is too great, the generation of a portion to which a modeling beam has not been radiated needs to be taken into consideration. As described above, one line scan is performed by one side reflection surface of the first polygon mirror 21 whose incident angle of a modeling beam continues to change while rotating. Accordingly, if the first polygon mirror 21 continues to rotate in a single direction, control while the modeling beam goes on from one side reflection surface to the other side reflection surface neighboring the one side reflection surface may be performed by making off the output of the modeling light source unit 15 or blocking the modeling beam using an additional element, such as a shutter, or using a method using a blocking film disposed near the modeling plane. A method for lowering the output of the modeling beam to the extent that the curing or sintering action of a modeling material is not generated although the modeling beam is incident on the modeling plane may be taken into consideration. An embodiment of such a configuration is shown in FIG. 11.

Furthermore, if the first polygon mirror 21 alternately rotates forward and backward, only one side reflection surface of the first polygon mirror 21 is used in all of line scans. Such a configuration is not preferred. This is described later.

Next, with respect to a '(1-2)-th configuration', an embodiment of such a configuration is shown in FIG. 14. The first light guide unit 20 includes a seventh polygon mirror 24. The seventh polygon mirror 24 is disposed using a tenth axis 10x parallel to the third axis 3 as its rotation center axis. The second light guide unit 30 includes an eighth polygon mirror 34. The eighth polygon mirror 34 is disposed using an eleventh axis 11x parallel to the first axis 1 as its rotation center axis. A plurality of times of line scans in the direction parallel to the second axis 2 is performed as the eighth polygon mirror 34 rotates. Stepping at a specific interval in the direction of the first axis 1 is performed as the seventh polygon mirror 24 rotates. As described above, one line scan is performed by one side reflection surface of the eighth polygon mirror 34 whose incident angle of a modeling beam continues to change while rotating, and the eighth polygon mirror 34 continues to rotate in a single direction. Accordingly, control while the modeling beam goes on from one side reflection surface to the other side reflection surface neighboring the one side reflection surface may be performed by making off the output of the modeling light source unit 15 or blocking the modeling beam using an additional element, such as a shutter, or using a method using a blocking film disposed near the modeling plane. A method for lowering the output of the modeling beam to the extent that the curing or sintering action of a modeling material is not generated although the modeling beam is incident on the modeling plane may be taken into consideration. Furthermore, if the seventh polygon mirror 24 alternately rotates forward and backward, only one side reflection surface of the seventh polygon mirror 24 is used in all of line scans.

In order to implement the second scanning pattern, two configurations are proposed in the head assembly for a three-dimensional modeling equipment of the present invention.

First, with respect to the '(2-1)-th configuration', an embodiment of such a configuration is shown in FIG. 12. The first light guide unit 20 includes a third polygon mirror 22. The third polygon mirror 22 is disposed using a sixth axis 6 parallel to the first axis 1 as its rotation center axis. The second light guide unit 30 includes a fourth polygon mirror 32. The fourth polygon mirror 32 is disposed using a seventh axis 7 parallel to the third axis 3 as its rotation center axis. A line scan in the direction parallel to the first axis 1 is performed as the fourth polygon mirror 32 rotates, and stepping at a specific interval in the direction of the second axis 2 is performed as the third polygon mirror 22 rotates. One line scan is performed by one side reflection surface of the fourth polygon mirror 32 whose incident angle of a modeling beam continues to change while rotating. If the fourth polygon mirror 32 continues to rotate in a single direction, control while the modeling beam goes on from one side reflection surface to the other side reflection surface neighboring the one side reflection surface may be performed by making off the output of the modeling light source unit 15 or blocking the modeling beam using an additional element, such as a shutter, or using a method using a blocking film disposed near the modeling plane. A method for lowering the output of the modeling beam to the extent that the curing or sintering action of a modeling material is not generated although the modeling beam is incident on the modeling plane may be taken into consideration. Furthermore, the stepping of each line scan in the direction of the second axis 2 is generated because the third polygon mirror 22 rotates at a specific angular displacement and therefore the location where a modeling beam is reflected by a side reflection surface of the fourth polygon mirror 32 is stepped. Furthermore, if the fourth polygon mirror 32 alternately rotates forward and backward, only one side reflection surface of the fourth polygon mirror 32 is used in all of line scans (in this case, such a configuration is not preferred. This is described later).

Next, with respect to the '(2-2)-th configuration', an embodiment of such a configuration is shown in FIG. 13. The first light guide unit 20 includes a fifth polygon mirror 23. The fifth polygon mirror 23 is disposed using an eighth axis 8 forming a specific angle to the third axis 3 as its rotation center axis. The second light guide unit 30 includes a sixth polygon mirror 33. The sixth polygon mirror 33 is disposed using a ninth axis 9 parallel to the first axis 1 as its rotation center axis. A plurality of times of line scans in the direction parallel to the first axis 1 is performed as the fifth polygon mirror 23 rotates. Stepping at a specific interval in the direction of the second axis 2 is performed as the sixth polygon mirror 33 rotates. One line scan is performed by one side reflection surface of the fifth polygon mirror 23 whose incident angle of a modeling beam continues to change while rotating. Accordingly, if the fifth polygon mirror 23 continues to rotate in a single direction, control while the modeling beam goes on from one side reflection surface of the fifth polygon mirror 23 to the other side reflection surface neighboring the one side reflection surface may be performed by making off the output of the modeling light source unit 15 or blocking the modeling beam using an additional element, such as a shutter, or using a method using a blocking film disposed near the modeling plane. A method for lowering the output of the modeling beam to the extent that the curing or sintering action of a modeling material is not generated although the modeling beam is incident on the modeling plane may be taken into consideration. Furthermore, the stepping of each line scan in the direction of the second axis 2 is generated because the location where a modeling beam is reflected is stepped as the sixth polygon mirror 33 rotates at a specific angular displacement. Furthermore, if the fifth polygon mirror 23 alternately rotates forward and backward, only one side reflection surface of the fifth polygon mirror 23 is used in all of line scans.

A method for scanning the modeling plane 10 using the head assembly for a three-dimensional modeling equipment of the present invention is described below. To this end, it is a premise that a modeling material has been actually supplied and located in the modeling plane 10. After the scanning of a modeling beam for one modeling plane 10 is completed, one modeling layer is formed. Such modeling layers are stacked to form one three-dimensional modeling product. In the scanning of the modeling plane 10, a portion to which the modeling beam has not been radiated should not be present. It is preferred that scanning is performed through an optimal path capable of minimizing the time taken for the scanning.

First, a method for scanning the modeling plane 10 using the head assembly of three-dimensional modeling equipment having the '(1-1)-th configuration' is described. First, the first polygon mirror 21 rotates in a single direction, and the modeling light source unit 15 starts to have a modeling beam incident on the first polygon mirror 21. Second, while the first polygon mirror 21 continues to rotate at a specific speed, a modeling beam primarily reflected by the first polygon mirror 21 is secondarily reflected by the second polygon mirror 31 and then performs a line scan on the modeling plane 10 in the direction parallel to the second axis 2. Third, a modeling beam 11 is controlled so that it is not radiated to the modeling plane 10, and thus the line scan in the second step is terminated. Control at this time may be performed by making off the output of the modeling light source unit 15 or using an additional element, such as a shutter, or a blocking film disposed near the modeling plane. A method for lowering the output of a modeling beam to the extent that the curing or sintering action of the modeling material is not generated although the modeling beam is incident on the modeling plane may be taken into consideration. Fourth, after the line scan in the second step, in order to perform a next line scan after stepping at a specific interval in the direction of the first axis 1, the second polygon mirror 31 rotates at a specific angular displacement, and the first polygon mirror 21 continues to rotate in the same direction until a next reflection surface neighboring a previous reflection surface reaches a specific location. In this case, if the rotation of the second polygon mirror 31 and the rotation of the first polygon mirror 21 are performed at the same time, a total modeling time can be reduced. Fifth, the first step to the fourth step are repeatedly performed on the entire surface of the modeling plane 10 until the radiation of the modeling beam is completed. In such a method, it is preferred that the first polygon mirror 21 rotates only in a specific one direction. If the first polygon mirror 21 rotates only in a single direction, the time taken between one line scan and a next line scan can be minimized, and the time taken to accelerate the first polygon mirror 21 from a stop state can also be minimized. Accordingly, a total time taken for modeling can be reduced. In this case, the first polygon mirror 21 may be configured to alternately rotate forward and backward as in the case shown in FIG. 10, but a practical profit using the present invention is reduced because the time taken for each line scan is increased as the first polygon mirror 21 repeats the forward rotation-stop-backward rotation-stop process is repeated under such a configuration. Furthermore, an electric motor element for driving the first polygon mirror 21 becomes more complicated, and a good possibility that more severe vibration and noise may be generated in the repeated process must be taken into consideration. It is evident that the second polygon mirror 31 also needs to continue to rotate in a single direction within a process of scanning one modeling plane 10. When a next modeling plane 10 is scanned after the scanning of one modeling plane 10 is completed, the second polygon mirror 31 may rotate in the same direction as a rotation direction in a process of scanning a previous modeling plane 10 or may rotate in an opposite direction. The reason for this is that a problem, such as that in the first polygon mirror 21, is not generated because the second polygon mirror 31 needs to be in the stop state while the line scan is performed. In the latter case, however, the second polygon mirror 31 does not need to be essentially configured using a mirror of a polygon form.

First, a method for scanning the modeling plane 10 using the head assembly of three-dimensional modeling equipment having the '(1-2)-th configuration' is described below. An embodiment of a procedure of the method is shown in FIG. 14. First, the eighth polygon mirror 34 rotates in a single direction, and the modeling light source unit 15 starts to have a modeling beam incident on the seventh polygon mirror 24. Second, while the eighth polygon mirror 34 continues to rotate at a specific speed, a modeling beam primarily reflected by the seventh polygon mirror 24 is secondarily reflected by the eighth polygon mirror 34 and then performs a line scan on the modeling plane 10 in the direction parallel to the second axis 2. Third, the modeling beam 11 is controlled so that it is not radiated to the modeling plane 10, and thus the line scan in the second step is terminated. Control at this time may be performed by making off the output of the modeling light source unit 15 or using an additional element, such as a shutter, or a blocking film disposed near the modeling plane. A method for lowering the output of a modeling beam to the extent that the curing or sintering action of the modeling material is not generated although the modeling beam is incident on the modeling plane may be taken into consideration. Fourth, after the line scan in the second step, in order to perform a next line scan after stepping at a specific interval in the direction of the first axis 1, the seventh polygon mirror 24 rotates at a specific angular displacement, and the eighth polygon mirror 34 continues to rotate in the same direction until a next reflection surface neighboring a previous reflection surface reaches a specific location. In this case, if the rotation of the eighth polygon mirror 34 and the rotation of the seventh polygon mirror 24 are performed at the same time, a total modeling time can be reduced. Fifth, the first step to the fourth step are repeatedly performed until the radiation of the modeling beam to the entire surface of the modeling plane 10 is completed. In such a method, it is preferred that the eighth polygon mirror 34 rotates only in a specific one direction. If the eighth polygon mirror 34 rotates only in a single direction as described above, the time taken between one line scan and a next line scan can be minimized, and the time taken to accelerate the eighth polygon mirror 34 from a stop state can also be minimized. Accordingly, a total time taken for modeling can be reduced. The eighth polygon mirror 34 may be configured to alternately rotate forward and backward, but a practical profit using the present invention is reduced because the time taken for each line scan is increased as the eighth polygon mirror 34 repeats the forward rotation-stop-backward rotation-stop process is repeated under such a configuration. Furthermore, an electric motor element for driving the eighth polygon mirror 34 becomes more complicated, and a good possibility that more severe vibration and noise may be generated in the repeated process must be taken into consideration. It is evident that the seventh polygon mirror 24 also needs to continue to rotate in a single direction within a process of scanning one modeling plane 10. When a next modeling plane 10 is scanned after the scanning of one modeling plane 10 is completed, the seventh polygon mirror 24 may rotate in the same direction as a rotation direction in a process of scanning a previous modeling plane 10 or may rotate in an opposite direction. The reason for this is that a problem, such as that in the eighth polygon mirror 34, is not generated because the seventh polygon mirror 24 needs to be in the stop state while the line scan is performed. In the latter case, however, the seventh polygon mirror 24 does not need to be essentially configured using a mirror of a polygon form.

A method for scanning the modeling plane 10 using the head assembly of three-dimensional modeling equipment having the (2-1)-th configuration is described below. First, the fourth polygon mirror 32 rotates in a single direction, and the modeling light source unit 15 starts to have a modeling beam incident on the third polygon mirror 22. Second, while the fourth polygon mirror 32 continues to rotate at a specific speed, a modeling beam primarily reflected by the third polygon mirror 22 is secondarily reflected by the fourth polygon mirror 32 and then performs a line scan on the modeling plane 10 in the direction parallel to the first axis 1. Third, the modeling beam 11 is controlled so that it is not radiated to the modeling plane 10, and thus the line scan in the second step is terminated. Control at this time may be performed by making off the output of the modeling light source unit 15 or using an additional element, such as a shutter, or a blocking film disposed near the modeling plane. A method for lowering the output of a modeling beam to the extent that the curing or sintering action of the modeling material is not generated although the modeling beam is incident on the modeling plane may be taken into consideration. Fourth, after the line scan in the second step, in order to perform a next line scan in the state in which the line scan has been stepped at a specific interval in the direction of the second axis 2, the third polygon mirror 22 rotates at a specific angular displacement, and the fourth polygon mirror 32 continues to rotate in the same direction until a next reflection surface neighboring a previous reflection surface reaches a specific location. In this case, if the rotation of the third polygon mirror 22 and the rotation of the fourth polygon mirror 32 are performed at the same time, a total modeling time can be reduced. Fifth, the first step to the fourth step are repeatedly performed until the radiation of the modeling beam to the entire surface of the modeling plane 10 is completed. In this method, it is preferred that the fourth polygon mirror 32 rotates only in a specific one direction. Furthermore, the third polygon mirror 22 needs to continue to rotate in the same direction in the process of scanning one modeling plane 10, but may start to rotate in the same direction as a rotation direction in the scanning of a previous modeling plane 10 when the scanning of a next modeling plane 10 starts or may rotate in a different direction. In the latter case, the third polygon mirror 22 does not need to be essentially configured using a mirror of a polygon form.

A method for scanning the modeling plane 10 using the head assembly of three-dimensional modeling equipment having the (2-2)-th configuration is described below. First, the fifth polygon mirror 23 rotates in a single direction, and the modeling light source unit 15 starts to have a modeling beam incident on the fifth polygon mirror 23. Second, while the fifth polygon mirror 23 continues to rotate at a specific speed, a modeling beam primarily reflected by the fifth polygon mirror 23 is secondarily reflected by the sixth polygon mirror 33 and then performs a line scan on the modeling plane 10 in the direction parallel to the first axis 1. Third, the modeling beam 11 is controlled so that it is not radiated to the modeling plane 10, and thus the line scan in the second step is terminated. Control at this time may be performed by making off the output of the modeling light source unit 15 or using an additional element, such as a shutter, or a blocking film disposed near the modeling plane. A method for lowering the output of a modeling beam to the extent that the curing or sintering action of the modeling material is not generated although the modeling beam is incident on the modeling plane may be taken into consideration. Fourth, after the line scan in the second step, in order to perform a next line scan in the state in which the line scan has been stepped at a specific interval in the direction of the second axis 2, the sixth polygon mirror 33 rotates at a specific angular displacement, and the fifth polygon mirror 23 continues to rotate in the same direction until a next reflection surface neighboring a previous reflection surface reaches a specific location. In this case, if the rotation of the fifth polygon mirror 23 and the rotation of the sixth polygon mirror 33 are performed at the same time, a total modeling time can be reduced. Fifth, the first step to the fourth step are repeatedly performed until the radiation of the modeling beam to the entire surface of the modeling plane 10 is completed. In this method, it is preferred that the fifth polygon mirror 23 rotates only in a specific one direction. Furthermore, the sixth polygon mirror 33 needs to continue to rotate in the same direction in the process of scanning one modeling plane 10, but may start to rotate in the same direction as a rotation direction in the scanning of a previous modeling plane 10 when the scanning of a next modeling plane 10 starts or may rotate in a different direction. In the latter case, the sixth polygon mirror 33 does not need to be essentially configured using a mirror of a polygon form.

Although the present invention has been described with reference to the accompanying drawings, this is only one of various embodiments including the gist of the present invention and has its object of allowing a person having ordinary skill in the art to easily practice the embodiment. Accordingly, it is evident that the present invention is not limited to only the described embodiments. Accordingly, the range of protection of the present invention should be interpreted based on the following appended claims. Accordingly, the present invention should be construed as covering all modifications or variations derived from the meaning and scope of the appended claims and their equivalents. Furthermore, it is evident that the sizes of some elements of the drawings have been more enlarged or reduced than their actual sizes.

What is claimed is:

1. A multi-channel head assembly of three-dimensional modeling equipment, comprising:
    a modeling light source unit which has at least one modeling beam incident on a light guide unit;
    a light guide unit which receives the incident at least one modeling beam and has a function for having the at least one modeling beam be incident on a respective at least one modeling plane by guiding each of the at least one modeling beam to a specific path;
    a control unit which controls driving of the modeling light source unit and the light guide unit by interlocking;
    the modeling light source unit comprising a light output distributor; and
    the light output distributor generating the at least one modeling beam by outputting and distributing an input beam;

wherein at least one three-dimensional modeling product is modeled by radiating each of the at least one modeling beam to an entire surface of one of the at least one modeling plane in a specific scanning pattern, and wherein the light guide unit comprises (1-1)-th to (1-N)-th light reflection units (60a, 60b, 60c) (N=3) having a function for having the respective at least one modeling beam incident on a second light reflection unit (70), by primarily reflecting the at least one modeling beam and a second light reflection unit (70) having a function for having the at least one modeling beam received from the (1-1)-th to (1-N)-th light reflection units (60a, 60b, 60c) (N=3) incident on the at least one modeling plane by secondarily reflecting the at least one modeling beam, and the (1-1)-th to (1-N)-th light reflection units (60a, 60b, 60c) (N=3) are spaced apart at specific angles around the second light reflection unit (70) using the second light reflection unit (70) as a center.

2. The multi-channel head assembly of claim 1, wherein:
a plurality of beams of the at least one modeling beam incident on the light guide unit have an identical wavelength, and
a plurality of products of the at least one three-dimensional modeling product modeled by the at least one modeling beam have an identical or different shape.

3. The multi-channel head assembly of claim 1, wherein the modeling light source unit further comprises:
a light modulation unit (17) having a function for modulating a wavelength, phase or power of a beam;
a multiplexer (18) having a function for generating a composed beam; and a demultiplexer (19) having a function for splitting a composed beam for each wavelength band.

4. The multi-channel head assembly of claim 3, wherein the at least one modeling beams which are output of the demultiplexer (19) are synchronized or simultaneously generated.

5. The multi-channel head assembly of claim 1, wherein:
each of the (1-1)-th to (1-N)-th light reflection units (60a, 60b, 60c) (N=3) comprises each of (1-1)-th to (1-N)-th polygon reflectors (61a, 61b, 61c) (N=3) having a specific number of light reflection surfaces on a side and rotating around a specific rotating axis,
the rotating axis of each of the (1-1)-th to (1-N)-th polygon reflectors (61a, 61b, 61c) (N=3) is disposed in parallel to the at least one modeling planes,
the second light reflection unit (70) comprises a second polygon reflector (71) having a specific number of light reflection surfaces on a side and rotating around a specific rotating axis, and
the rotating axis of the second polygon reflector (71) is disposed perpendicular to the at least one modeling plane.

6. The multi-channel head assembly of claim 5, wherein:
a scanning pattern for each of the at least one modeling plane is a pattern formed as each of a plurality of times of line scans having a direction parallel to a direction (radius direction) from a location of the second polygon reflector (71) to a location of each of the (1-1)-th to (1-N)-th polygon reflectors (61a, 61b, 61c) (N=3) is stepped at a specific interval in a direction (tangent direction) perpendicular to the radius direction, and
the plurality of times of line scans in the direction parallel to the radius direction is performed as each of the (1-1)-th to (1-N)-th polygon reflectors (61a, 61b, 61c) (N=3) rotates, and the stepping at the specific interval in the tangent direction is performed as the second polygon reflector (71) rotates.

7. The multi-channel head assembly of claim 6, wherein the control unit further comprises:
a first photosensor unit (41) having a function for determining start timing of each of a plurality of times of line scans in the direction parallel to the radius direction or the tangent direction by sensing a modeling beam incident on a specific point and synchronizing the driving of the modeling light source unit (15) and the driving of the (1-1)-th to (1-N)-th polygon reflectors (61a, 61b, 61c) (N=3) or the second polygon reflector (71);
a second photosensor unit (42) having a function for determining first start timing of radiation of the modeling beam to each of the at least one modeling plane (10) by sensing the modeling beam incident on a specific location of each of the at least one modeling plane (10) and synchronizing the driving of the modeling light source unit (15) and the driving of the (1-1)-th to (1-N)-th polygon reflectors (61a, 61b, 61c) (N=3), or the second polygon reflector (71);
a third photosensor unit (43) having a function for determining final end timing of radiation of the at least one modeling beam to each of the at least one modeling plane (10) by sensing the at least on modeling beam incident on a specific location of each of the at least one modeling plane (10); and
a fourth photosensor unit (44) having a function for determining end timing of each of a plurality of times of line scans in the direction parallel to the radius direction or the tangent direction by sensing a modeling beam incident on a specific point and synchronizing the driving of the modeling light source unit (15) and the driving of the (1-1)-th to (1-N)-th polygon reflectors (61a, 61b, 61c) (N=3), or the second polygon reflector (71).

8. The multi-channel head assembly of claim 5, wherein:
a scanning pattern for each of the at least one modeling plane is a pattern in which a plurality of times of line scans is performed in a direction (tangent direction) perpendicular to a radius direction as the line scan is stepped at a specific interval in a direction parallel to the direction (radius direction) from a location of the second polygon reflector (71) to a location of each of the (1-1)-th to (1-N)-th polygon reflectors (61a, 61b, 61c) (N=3), and
the plurality of times of line scans in the direction parallel to the tangent direction is performed as the second polygon reflector (71) rotates, and the stepping at the specific interval in the radius direction is performed as the (1-1)-th to (1-N)-th polygon reflectors (61a, 61b, 61c) (N=3) rotate.

9. The multi-channel head assembly of claim 1, wherein:
the light guide unit comprises at least one light guide module X,
the control unit controls the modeling light source unit and each of the at least one light guide module X by interlocking,
each of the at least one light guide module X comprises a first light guide unit (20) disposed at a specific location over any one of the at least one modeling plane (10) and having a function for receiving one of at least one the modeling beam and having the received modeling beam incident on the second light guide unit (30) by primarily reflecting the received modeling beam, and a second light guide unit (30) disposed at a specific location over any one of the at least one modeling plane and having a function for having the at least one modeling beam received by the first light guide unit (20) incident on one of the at least one modeling plane (10) by secondarily reflecting the received modeling beam, at least one of the first light guide unit (20) and the second light guide unit (30) comprises a specific number of light reflection surfaces on a side and comprises a polygon mirror rotating in a single direction around a specific rotating axis, and the control unit controls the driving of the modeling light source unit, the first light guide unit and the second light guide unit by interlocking.

10. The multi-channel head assembly of claim 9, wherein:

each of the at least one modeling beam is incident on the first light guide unit (20) at a specific angle to a second axis (2) with respect to each of the at least one modeling plane having a first axis (1) and the second axis (2) which are perpendicular to a third axis (3) and perpendicular to each other, and a scanning pattern for each of the at least one modeling plane is a pattern formed as each of a plurality of times of line scans having a direction parallel to the second axis (2) or the first axis (1) is stepped at a specific interval in the direction of the first axis (1) or the second axis (2).

11. The multi-channel head assembly of claim 1, wherein:

a plurality of beams of the at least one modeling beam incident on the light guide unit have different wavelengths, and a plurality of products of the at least one three-dimensional modeling product modeled by the plurality of beams of the at least one modeling beam have different shapes.

12. A method for scanning a plurality of modeling planes using the multi-channel head assembly of three-dimensional modeling equipment of claim 6, the method comprising:

(i) a step (s10) of rotating, by the (1-1)-th to (1-N)-th polygon reflectors (61a, 61b, 61c) (N=3), in a single direction and starting, by the modeling light source unit (15), to have a modeling beam incident on the (1-1)-th to (1-N)-th polygon reflectors (61a, 61b, 61c) (N=3);

(ii) a step (s20) of secondarily reflecting, by the second polygon reflector (71), a modeling beam primarily reflected by each of the (1-1)-th to (1-N)-th polygon reflectors (61a, 61b, 61c) (N=3) and then performing a line scan on the modeling plane (10) in the direction parallel to the radius direction, while each of the (1-1)-th to (1-N)-th polygon reflectors (61a, 61b, 61c) (N=3) continues to rotate at a specific speed;

(iii) a step (s30) of terminating the line scan in the step (ii) by controlling each of the at least one modeling beam so that the at least one modeling beam is not radiated to the at least one modeling plane (10);

(iv) a step (s40) of rotating, by the second polygon reflector (71), at a specific angular displacement and continuing to rotate, by the (1-1)-th to the (1-N)-th polygon reflectors, in a same direction until a next reflection surface neighboring a previous reflection surface reaches a specific location in order to perform a next line scan after stepping at a specific interval in the tangent direction after the line scan in the step (ii); and (v) a step (s50) of repeatedly performing the step (i) to the step (iv) on the entire surface of each of the at least one modeling plane (10) until radiation of the at least one modeling beam is completed, wherein each of the (1-1)-th to (1-N)-th polygon reflectors (61a, 61b, 61c) (N=3) rotates only in a specific one direction.

13. The method of claim 12, further comprising a step (s55) of preparing, by the second polygon reflector (71), to rotate in a direction identical or opposite to a rotation direction in the step (v) after the step (v).

14. The method of claim 12, wherein the rotation of the second polygon reflector (71) and the rotation of the (1-1)-th to (1-N)-th polygon reflectors (61a, 61b, 61c) (N=3) in the step (iv) are simultaneously performed.

15. A method for scanning a plurality of modeling planes using the multi-channel head assembly of three-dimensional modeling equipment of claim 8, the method comprising:

(i) a step (s100) of rotating, by the second polygon reflector (71), in a single direction and starting, by the modeling light source unit (15), to have the at least one modeling beam incident on the (1-1)-th to (1-N)-th polygon reflectors (61a, 61b, 61c) (N=3), respectively;

(ii) a step (s200) of secondarily reflecting, by the second polygon reflector (71), the at least one modeling beam primarily reflected by the (1-1)-th to (1-N)-th polygon reflectors (61a, 61b, 61c) (N=3), respectively, and then performing a line scan on the at least one modeling plane (10) in the direction parallel to the tangent direction, while the second polygon reflector continues to rotate at a specific speed;

(iii) a step (s300) of terminating the line scan in the step (ii) by controlling each of the at least one modeling beam so that the at least one modeling beam is not radiated to the at least one modeling plane (10);

(iv) a step (s400) of rotating, by the (1-1)-th to (1-N)-th polygon reflectors (61a, 61b, 61c) (N=3), at a specific angular displacement and continuing to rotate, by the second polygon reflector (71), in a same direction until a next reflection surface neighboring a previous reflection surface reaches a specific location in order to perform a next line scan after stepping at a specific interval in the radius direction after the line scan in the step (ii); and (v) a step (s500) of repeatedly performing the step (i) to the step (iv) on the entire surface of each of the at least one modeling plane (10) until radiation of the at least one modeling beam is completed, wherein the second polygon reflector (71) rotates only in a specific one direction.

* * * * *